US010218753B2

(12) United States Patent
Baker et al.

(10) Patent No.: US 10,218,753 B2
(45) Date of Patent: Feb. 26, 2019

(54) VIDEO ACTIVATION BUTTON

(71) Applicant: GM GLOBAL TECHNOLOGY OPERATIONS LLC, Detroit, MI (US)

(72) Inventors: Charles R. Baker, Northville, MI (US); Akram M. Abdel-Rahman, Ajax (CA); Mohannad Murad, Troy, MI (US); Gerard R. Kreiner, Waterford, MI (US); Joseph Machak, Oakland Township, MI (US); Daniel C. McGarry, Oxford, MI (US); Samer Zakhem, Troy, MI (US); Matt C. Videtich, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 15/167,776

(22) Filed: May 27, 2016

(65) Prior Publication Data

US 2017/0346878 A1  Nov. 30, 2017

(51) Int. Cl.
*H04W 4/40* (2018.01)
*H04L 29/06* (2006.01)
*H04B 1/3822* (2015.01)
*H04L 29/08* (2006.01)

(52) U.S. Cl.
CPC ......... *H04L 65/403* (2013.01); *H04B 1/3822* (2013.01); *H04L 65/1069* (2013.01); *H04L 65/605* (2013.01); *H04L 67/125* (2013.01); *H04W 4/40* (2018.02)

(58) Field of Classification Search
None
See application file for complete search history.

(56) References Cited

U.S. PATENT DOCUMENTS

| 5,959,662 A | 9/1999 | Shaffer |
| 9,876,980 B2 | 1/2018 | Yamashiro et al. |
| 2009/0186596 A1* | 7/2009 | Kaltsukis ............... G08B 25/08 455/404.2 |
| 2010/0219944 A1 | 9/2010 | McCormick et al. |
| 2012/0062743 A1 | 3/2012 | Lynam et al. |
| 2012/0221677 A1* | 8/2012 | Kim .................. G01C 21/3694 709/217 |
| 2013/0329075 A1 | 12/2013 | Liang |
| 2014/0225719 A1 | 8/2014 | Kesavan |
| 2014/0306838 A1 | 10/2014 | Beumier |
| 2016/0001330 A1 | 1/2016 | Romack |

(Continued)

OTHER PUBLICATIONS

USPTO, Office Action for U.S. Appl. No. 15/167,839 dated Apr. 12, 2018.

(Continued)

*Primary Examiner* — Eileen M Adams
(74) *Attorney, Agent, or Firm* — Lorenz & Kopf, LLP

(57) ABSTRACT

Methods and systems are provided for transmitting video data from a vehicle. In one exemplary embodiment, a vehicle processor receives a video transmission command that has been generated in response to a user selection of a video transmission input device, and the vehicle processor transmits video data captured by one or more vehicle cameras in response to the received video transmission command, wherein transmission of video data is at least partly over a telecommunications network to a remote server.

20 Claims, 9 Drawing Sheets

(56) References Cited

U.S. PATENT DOCUMENTS

| | | |
|---|---|---|
| 2016/0258591 A1 | 9/2016 | Salter |
| 2016/0275790 A1 | 9/2016 | Kang et al. |
| 2016/0295089 A1 | 10/2016 | Farahani |
| 2017/0134687 A1 | 5/2017 | Rios, III et al. |
| 2017/0166163 A1* | 6/2017 | Poma ................. B60R 25/24 |
| 2017/0343372 A1* | 11/2017 | Vandanapu ........ G01C 21/3602 |

OTHER PUBLICATIONS

Baker, Charles R., U.S. Appl. No. 15/167,741 entitled, "Camera Activation Response to Vehicle Safety Event," filed May 27, 2016.
Baker, Charles R., U.S. Appl. No. 15/167,839 entitled, "Video Transmission Control" filed May 27, 2016.

* cited by examiner

VIDEO ACTIVATION BUTTON

TECHNICAL FIELD

The present disclosure generally relates to vehicles, and more particularly relates to methods and systems for transmitting video data using one or more cameras of the vehicle.

BACKGROUND

Theft, acts of vandalism, and other events can occur to a vehicle. Also, a vehicle owner may, in certain circumstances, desire an enhanced feel of security for the vehicle.

Accordingly, it may be desirable for a vehicle owner, the relevant authorities and other parties to be able to ascertain the cause of a vehicle event, or the culprits of theft and vandalism. In the case of thefts and vandalism, it would be desirable to prevent such acts wherever possible or at least provide a tool to assist such. Further, it may be desirable to provide a tool to allow an owner to be reassured on the security of a vehicle.

The present disclosure provides methods, systems and vehicles for achieving one or more of these desires in various embodiments and other related desires in various embodiments. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for transmitting video data from a vehicle. The method comprises receiving, via a vehicle processor, a video transmission command that has been generated in response to a user selection of a video transmission input device, and transmitting, via the vehicle processor, video data captured by one or more vehicle cameras in response to the received video transmission command, wherein transmission of video data is at least partly over a telecommunications network to a remote server.

In accordance with another exemplary embodiment, a method is provided for activating one or more cameras of a vehicle. The method comprises providing a key fob having a camera activation button or other input device for remotely activating one or more vehicle cameras or providing a user device having a key fob app that generates, via a processor of the user device, a graphical user interface having a camera activation button or other input device for remotely activating one or more vehicle cameras, transmitting a wireless command signal from a key fob or a user device in response to selection of the camera activation button or other input device, and activating the one or more vehicle cameras, via a vehicle processor, in response to the wireless command signal, to capture video data of at least the outside of the vehicle.

In accordance with a further exemplary embodiment, a system is provided for transmitting video data from a vehicle. The system comprises a video transmission input device and a vehicle processor. The video transmission input device is for generating a video transmission command in response to a user selection. The vehicle processor is configured to receive the video transmission command, and in response to the video transmission command, the vehicle processor is configured to receive video data captured by one or more vehicle cameras and activate transmission of the video data at least partly over a telecommunications network to a remote server.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
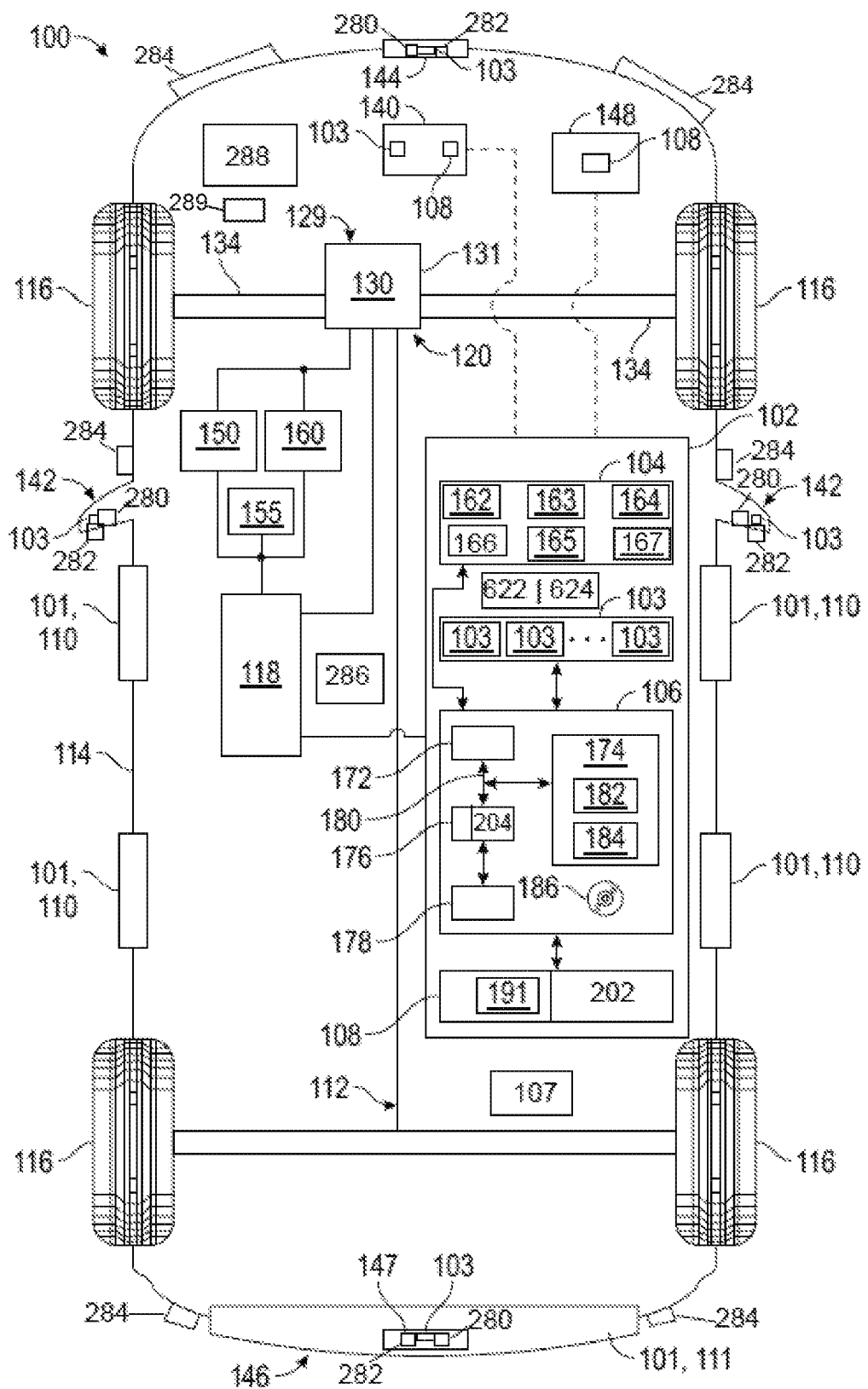
FIG. 1 is a functional block diagram of a vehicle that includes one or more vehicle cameras and a remote communications module for communicating video data to a remote server or remote user device, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes various doors 101 as well as a control system 102 for controlling video data, particularly the transmission thereof. In the depicted embodiment, the doors 101 include side doors 110 on the driver's side and passenger's side of the vehicle 100 as well as a rear door 111 in a rear portion (or rear region) 146 of the vehicle 100. In one embodiment, the rear door 111 comprises a rear hatch for the vehicle 100. In other embodiments, the rear door 111 may comprise a trunk door and/or other type of rear door. It will be appreciated that the number and/or configuration of doors 101 may vary in different embodiments.

Also as discussed further below, the control system 102 includes one or more cameras 103, a sensor array 104, a controller 106, and a display system 108 (also referred to herein as a display unit). In various embodiments, the control system 102 is configured to control the one or more cameras 103 and to control transmission of video data captured by the one or more cameras 103.

In one embodiment depicted in FIG. 1, vehicle 100 includes, in addition to the above-referenced doors 101, rear region 146, and control system 102, a chassis 112, a body 114, four wheels 116, an electronic system 118, a powertrain 129, a rear view mirror 140, side mirrors 142, a front grill 144, an infotainment system 148 (e.g. radio, video, navigation, and/or other system providing information and/or entertainment for a user of the vehicle 100) a steering system 150, a braking system 155, and one or more other driver input systems 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine, and is housed in an engine mounting apparatus 131. In various other embodiments, the engine 130 may comprise an electric motor and/or one or more other transmission system 129 components (e.g. for an electric vehicle).

It will be appreciated that in other embodiments, the actuator assembly 120 may include one or more other types of engines and/or motors, such as an electric motor/generator, instead of or in addition to the combustion engine. In certain embodiments, the electronic system 118 comprises an engine system that controls the engine 130 and/or one or more other systems of the vehicle 100.

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In one embodiment, the steering system may include a non-depicted steering wheel and a steering column. In various embodiments, the steering wheel receives inputs from a driver of the vehicle 100, and the steering column results in desired steering angles for the wheels 116 via the drive shafts 134 based on the inputs from the driver. In certain embodiments, an autonomous vehicle may utilize steering commands that are generated by a computer, with no involvement from the driver.

The braking system 155 is mounted on the chassis 112, and provides braking for the vehicle 100. The braking system 155 receives inputs from the driver via a non-depicted brake pedal, and provides appropriate braking via brake units (not depicted).

Other driver input systems 160 may include an acceleration input system comprising an accelerator pedal 161 that is engaged by a driver, with the engagement representative of a desired speed or acceleration of the vehicle 100. The other driver input systems 160 may also include, among other possible systems, various other inputs for various vehicle devices and/or systems, such as for the infotainment system 148, and/or one or more environmental systems, lighting units, and the like (not depicted). Similar to the discussion above regarding possible variations for the vehicle 100, in certain embodiments steering, braking, suspension, acceleration, and/or other driving features can be commanded by a computer instead of by a driver.

In one embodiment, the control system 102 is mounted on the chassis 112. As discussed above, the control system 102 provided is configured to control various aspects of operation of the one or more cameras 103 and transmission, e.g. streaming, of video data captured by the one or more cameras 103.

As noted above and depicted in FIG. 1, in one embodiment the control system 102 comprises a plurality of cameras 103, a sensor array 104, a controller 106, a remote communications module 202, and a display system 108. While the components of the control system 102 (including the cameras 103, the sensor array 104, the controller 106, and the display system 108) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, the electronic system 118, and/or one or more other systems of the vehicle 100.

The plurality of cameras 103 are operable to obtain video data with respect to various different locations associated with the vehicle 100. As depicted in one embodiment, cameras 103 are included within or proximate each of the rear view mirror 140, side mirrors 142, front grill 144, and rear region 146 (e.g. trunk 147 or rear door/hatch 111). In one embodiment, the cameras 103 comprise video cameras controlled via the controller 106. In various embodiments, the cameras 103 may also be disposed in or proximate one or more other locations of the vehicle 100. For example, more or less than four cameras 103 could be included, such as six cameras 103 for capturing video data of the vehicles outside surroundings. Although the one or more cameras 103 are shown for capturing video data of the outside of the vehicle 100, the one or more cameras 103 can include one or more cameras 103 for capturing video data of the interior of the vehicle 100. Such one or more interior cameras 103 may be arranged for capturing videos data of the driver of the vehicle 100 and optionally also at least one of a front passenger and any rear passengers.

In various embodiments, the vehicle 100 comprises one or more microphones 289 for picking up interior and/or exterior sound. The one or more microphones 289 may be included as part of the one or more cameras 103 or may be separate devices.

In some embodiments, the one or more cameras 103 are each associated with a camera washer or wiper 280. The camera washer or wiper 280 may comprise a blade for wiping a lens or other front optic of the camera 103. Alternatively, the camera washer or wiper 280 may comprise a nozzle and be associated with a pump for directing cleaning fluid (e.g. water) onto a front optic of the camera 103.

In some embodiments, the one or more cameras 103 are each associated with an articulator 282 for articulating the camera 103 to change the field of view. The articulator may comprise a motor (not shown), a transmission and a pivot to allow the camera 103 to change angle.

In various embodiments, the vehicle 100 is equipped with one or more illumination devices 284, 286. The one or more illumination devices 284, 286 may comprise one or more exterior illumination devices 284 for illuminating outside of the vehicle 100 or one or more interior illumination devices 286 for illuminating inside of the vehicle 100. The one or more illumination devices 284, 286 may comprise the front headlamps of the vehicle and/or rear taillights and/or indicator lights and/or any other lights already required in vehicle design. Alternatively, or additionally, the one or more illumination devices 284, 286 may be dedicated to the function of illuminating a field of view of the one or more cameras 103. Exemplary dedicated illumination devices 284, 286 may be located adjacent or co-located with the one or more cameras 103. The vehicle 100 may comprise front, rear and/or side illumination devices 284, 286 corresponding to front, rear and/or side cameras 103.

In various embodiments, the vehicle 100 comprises one or more sound devices 288, e.g. speakers 288. The one or more speakers 288 in conjunction with the vehicle control system 102, are configured to sound an alarm or horn. The alarm may be a siren like sound or a continuous sound. Alternatively, speech may be sounded to provide a comprehendible warning, such as a repeat warning of "stay away from the vehicle, you are being video monitored, police have been notified".

The sensor array 104 includes various sensors (also referred to herein as sensor units) that are used for providing measurements and/or data for use by the controller 106. In various embodiments, the sensors of the sensor array 104 comprise one or more detection sensors 162, event sensors 167, one or more security sensors 166, interface sensors 163, gear sensors 164, and/or wheel speed sensors 165. The detection sensors 162 (e.g. radar, lidar, sonar, machine vision, Hall Effect, and/or other sensors) detect objects in proximity to the vehicle 100. The interface sensors 163 detect a user's engagement of an interface of the vehicle 100 (e.g. a button, a knob, a display screen, and/or one or more other interfaces), for example in initiating a request for a display of the display system 108 with respect to the doors 101 of the vehicle 100. The gear sensors 164 detect a gear or transmission state of the vehicle 100 (e.g. park, drive, neutral, or reverse). The wheel speed sensors 165 measure a speed of one or more of the wheels 116 of the vehicle 100. It will be appreciated that in certain embodiments the cameras 103 may be considered as part of the sensor array 104. In various embodiments, the one or more security sensors 166 provide a sense signal relating to possible theft or vandalism of the vehicle 100. For example, the one or more security sensors 166 may include a force sensor such as a vibration sensor, an accelerometer or some other motion sensor for sensing that the vehicle 100 is the subject of a force possibly indicative of a theft event. The one or more security sensors 166 may comprise a sensor for indicating a key copy, which is an unauthorized copy of a key for unlocking the vehicle doors 101. The one or more security sensors 166 may comprise a door sensor for indicating that one or more of the vehicle doors 101 are open. Other sensors for indicating the security of the vehicle 100 with respect to theft and vandalism could also be included in the one or more security sensors 166.

In various embodiments, the one or more event sensors 167 comprise any one or more of at least one acceleration sensor, at least one impact sensor, at least one force sensor, at least one roll over sensor, and at least one pressure sensor.

The controller 106 is coupled to the remote communications module 202. The remote communications module 202 is configured to transmit, e.g. stream video captured by the one or more cameras 103 to a remote server 900 or to a remote user device 800 via a cellular network 1000, as will be discussed in further detail below. In some embodiments, the controller 106 is configured to transmit, e.g. stream, sound data captured by the one or more microphones 289. The sound data may be transmitted along with the video data to allow synchronized sound and video replay at the remote server 900 or the remote user device 800. The remote communications module 202 may comprise a control unit (not shown) and a transceiver (not shown) for transmitting and receiving data over the cellular network 1000. The remote communications module 202 may operate through third generation (3G) or fourth generation (4G) standards or any other telecommunications standard.

The controller 106 is coupled to the cameras 103, the sensor array 104, the remote communications module 202 and the display system 108. The controller 106 is configured to utilize the various measurements and information from the sensor array 104, particularly the one or more security sensors 166, and is configured to operate the one or more cameras 103 and stream captured video data via the remote communications module 202 in response thereto.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the electronic system 118, the infotainment system 148 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 106 and the computer system of the controller 106, generally in executing the processes described herein, such as the processes described with reference to the figures below.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives, an SD card and optical disk drives. In one exemplary embodiment, the storage device 178 comprises a program product from which memory 174 can receive a program 182 that executes one or more embodiments of one or more processes of the present disclosure, as will be described further below, particularly with respect to FIGS. 4, 5, 7 and 10. In another exemplary embodiment, the program product may be directly stored in and/or otherwise accessed by the memory 174 and/or a disk (e.g., disk 186), such as that referenced below. The storage device 178 may also store video data 204 captured by the one or more cameras 103. The video data 204 may be stored when the remote communications module 202 is not able to connect to a cellular network 1000 or even if the video data has also been streamed or otherwise sent to a remote server 900 or remote user device 800.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

The display system 108 is coupled to the controller 106. The display system 108 comprises a display screen 191. In one embodiment, the display screen 191 provides a visual display of photographic and/or recorded video images and data from the one or more cameras 103, via instructions provided by the processor 172, for viewing by a user within the vehicle 100.

Figure 2:
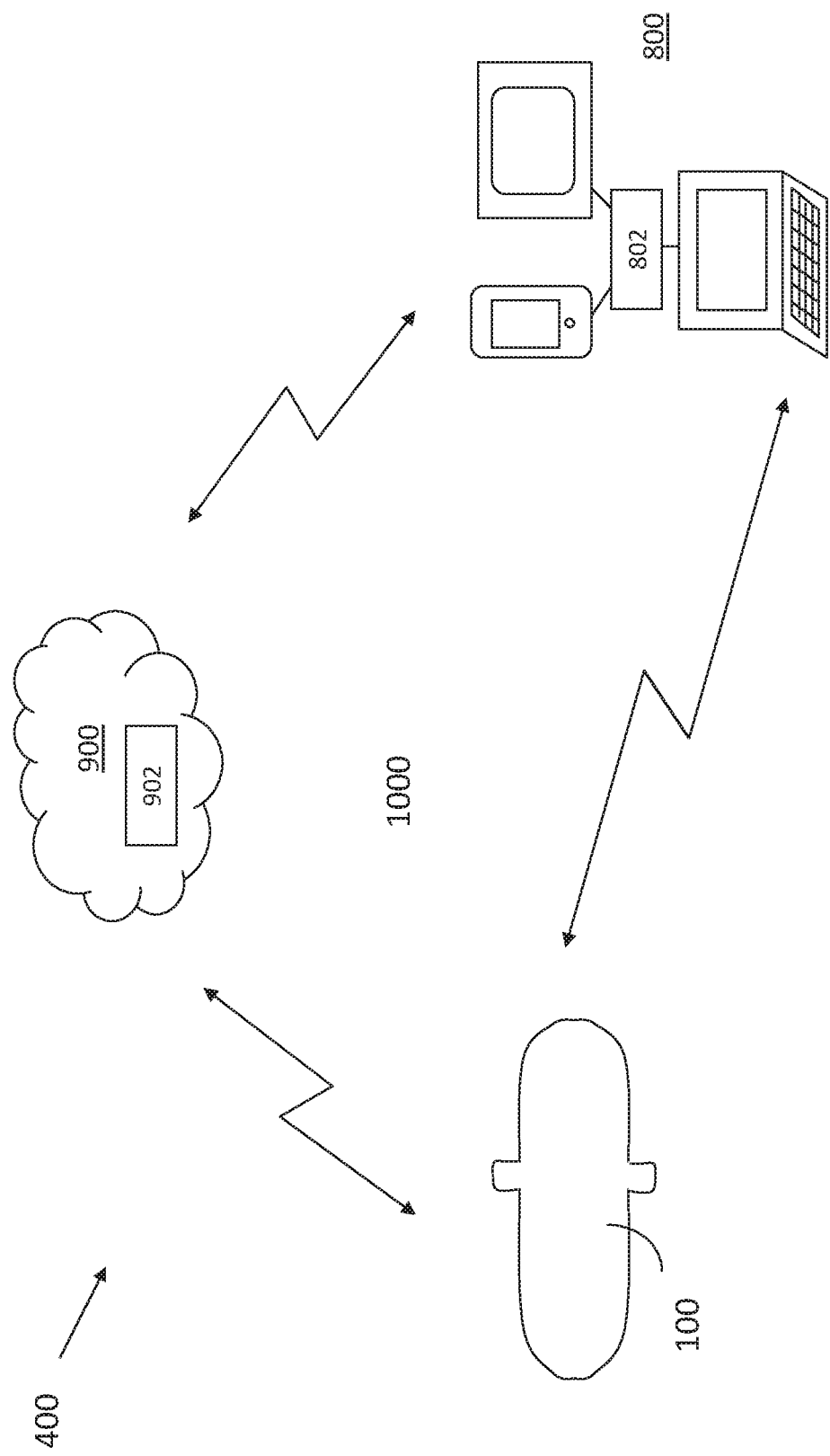
FIG. 2 is a functional block diagram of a network of a vehicle, a remote server and a remote user device, in accordance with an exemplary embodiment.

FIG. 2 shows a network 400 of the vehicle 100, specifically the control system 102 of the vehicle 100, a remote server 900 including a server control system 902, and one or more user devices 800 including one or more device control systems 802. The vehicle control system 102, the remoter server 900 and the device control systems are in communication over a cellular network 1000. The network 400 allows video to be streamed from the vehicle 100 to either the remote server 900 or the user device 800. The network also allows control commands to be sent from the remote server 900 or the user device 800 to the vehicle 100 relating to operation of the one or more cameras 103 and/or transmission, e.g. streaming, of video captured by the one or more cameras 103 and/or other vehicle control commands, as will be described in further detail below.

The remote server 900 may be staffed by one or more (human) operators (not shown) to allow audio and optionally also video communications with a driver of the vehicle (or a passenger). Such conferencing between the remote operator and the driver may be required to allow the driver to speak to a live operator at any time of day. The vehicle control system comprises one or more conferencing input devices 622, 624 or other input devices to initiate a remote conference between an operator at the remote server 900 and a driver or passenger of the vehicle 100. The operator can set up turn-by-turn directions, look up the address of a point of interest, or make changes to an account. The vehicle driver can also request a live diagnostic checkup, in which case the operator will pull information from the vehicle control system 102. Such conferencing also allows connection with an operator who is trained to deal with emergencies. The operator is able to contact the police, fire department, or request medical assistance in the case of an emergency. As will be explained below, the vehicle control system 102 may comprise two input buttons or other input devices 622, 624; one for conferencing with an operator for non-emergency situations and one for emergencies. It should be understood that the input buttons 622, 624 may be mechanical, electromechanical or graphics buttons on a display screen (such as vehicle display screen 191).

The user device 800 may be a mobile telephone, a tablet device, a desktop computer, a laptop or any other computing and communications device.

Figure 3:
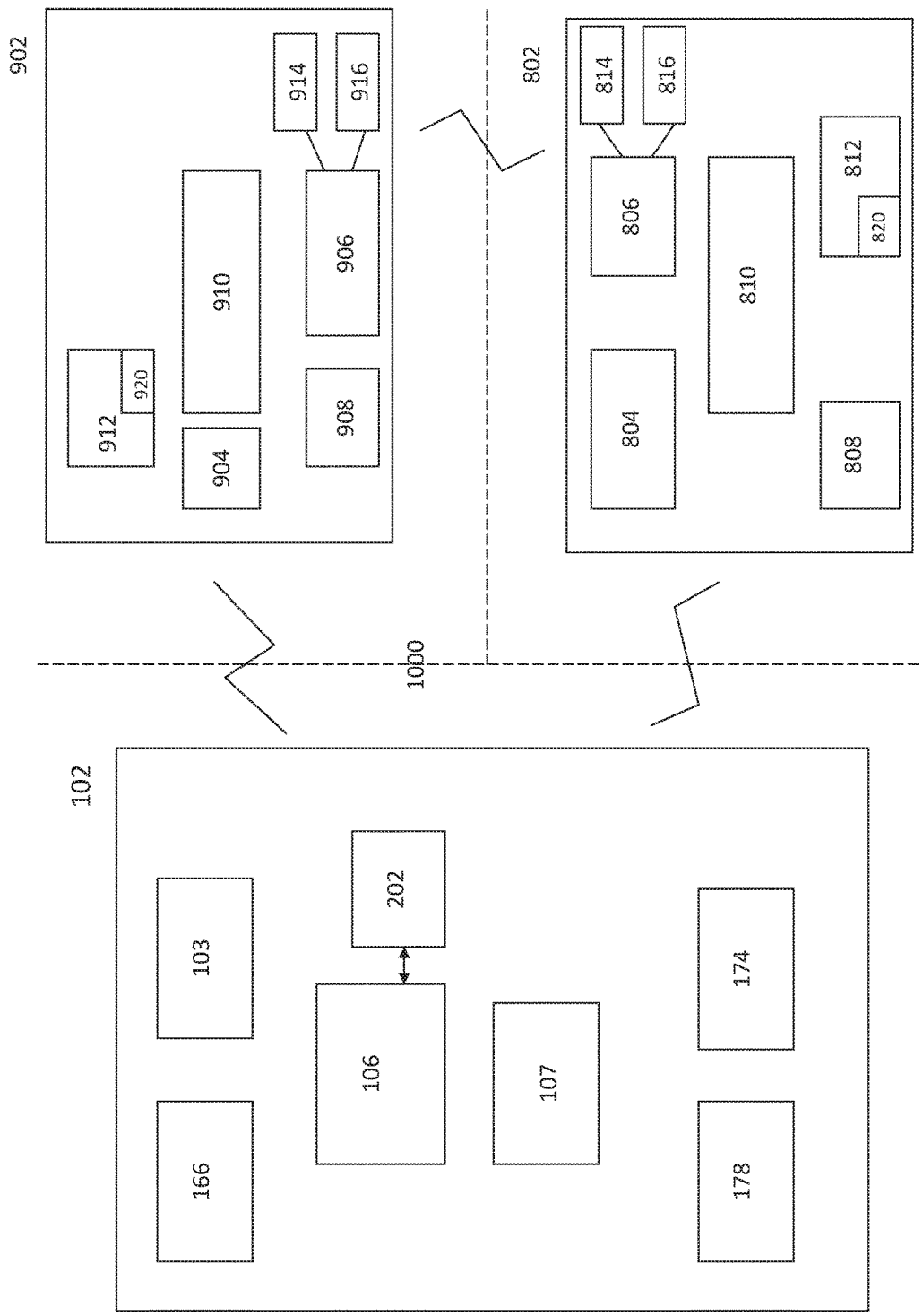
FIG. 3 is a functional block diagram of a vehicle control system, a remote server control system and a remote user device control system, in accordance with an exemplary embodiment.

FIG. 3 is a schematic view of control systems 102, 802, 902 configured for carrying out the network 400 and the various processes described further below. The vehicle control system 102 has been described in detail in the foregoing. Also shown is a server control system 902 and a user device control system 802. These control systems 102, 802, 902 are in communication with one another via a cellular network 1000. In various embodiments, the server control system 902 and the user device control system 802 are both included. In alternative embodiments, just one of the server control system 902 and the user device control system 802 is included in the network 400.

The server control system 902 comprises a computer system including a controller 910, a remote communications module 904, a memory 908, a data storage device 912 and an operator interface 906. In the depicted embodiment, the computer system of the controller 910 includes a processor (not shown), the memory 908, the storage device 912, and a bus (not shown). The processor performs the computation and control functions of the controller 910, and may comprise any type of processor or multiple processors, single integrated circuits such as a microprocessor, or any suitable number of integrated circuit devices and/or circuit boards working in cooperation to accomplish the functions of a processing unit. During operation, the processor or controller 910 executes one or more programs contained within the memory 908 and, as such, controls the general operation of the controller 910 and the computer system of the controller 910, generally in executing the processes described herein, such as the processes described with reference to the figures below. The one or more programs may include the app described further below.

The memory 908 can be any type of suitable memory. For example, the memory 908 may include various types of dynamic random access memory (DRAM) such as SDRAM, the various types of static RAM (SRAM), and the various types of non-volatile memory (PROM, EPROM, and flash). In certain examples, the memory 908 is located on and/or co-located on the same computer chip as the processor. In the depicted embodiment, the memory 908 stores one or more programs for executing at least part of the processes described herein, particularly the server controlled aspects of the processes.

The bus serves to transmit programs, data, status and other information or signals between the various components of the computer system of the controller 910.

The storage device 912 can be any suitable type of storage apparatus, including direct access storage devices such as hard disk drives, flash systems, floppy disk drives and optical disk drives. In one exemplary embodiment, the storage device 912 comprises a program product from which memory 908 can receive a program that executes one or more embodiments of one or more processes of the present disclosure, as will be described further below. In another exemplary embodiment, the program product may be directly stored in and/or otherwise accessed by the memory 908. The storage device 912 may also store video data 920 captured by the one or more cameras 103 of the vehicle 100 and sent to the remote server 900 via the cellular network 1000.

The bus can be any suitable physical or logical means of connecting computer systems and components. This includes, but is not limited to, direct hard-wired connections, fiber optics, infrared and wireless bus technologies. During operation, one or more programs are stored in the memory 908 and executed by the processor.

The server control system 902 also comprises an operator interface 906, which may include an input unit 916. The input unit 916 may include audio, keyboard, mouse, touchscreen and other input capabilities. The operator interface 906 may include audio, image and video output capabilities. The operator interface 906 may include a display unit 914 and speakers for outputting image, video and audio data to an operator.

The controller 910 is operable with the remote communications module 904 to receive video data sent over the cellular network 1000. In various embodiments, the controller 910 is operable to receive sound data transmitted over the cellular network 1000. The remote communications module 904 may comprise a control unit and a transceiver for transmitting and receiving data over the cellular network 1000. The remote communications module 904 may operate through third generation (3G) or fourth generation (4G) standards or any other telecommunications standard. In various embodiments, the controller 910 is configured to store the video data (and optionally the sound data) received over the cellular network 1000 in the data storage device 912. In various embodiments, the controller 910 is configured to output video data (and sound data) received from the vehicle 100 over the cellular network through the operator interface 906 to allow an operator to view outside surroundings of the vehicle 100 and/or the interior of the vehicle 100. In various embodiments, sound data is stored in the data storage device 912 and/or is output through the operator interface so that the video data and the sound data can be synchronously replayed. In this way, it is possible to ascertain further information on any event of interest.

The user device control system 802 comprises a computer system including a controller 810, a remote communications module 804, a memory 808, data storage device 812 and a user interface 806. In the depicted embodiment, the computer system of the controller 810 includes a processor (not shown), the memory 808, the storage device 812, and a bus (not shown). The processor performs the computation and control functions of the controller 810, and may comprise any type of processor or multiple processors, single integrated circuits such as a microprocessor, or any suitable number of integrated circuit devices and/or circuit boards working in cooperation to accomplish the functions of a processing unit. During operation, the processor 810 executes one or more programs contained within the memory 908 and, as such, controls the general operation of the controller 810 and the computer system of the controller 810, generally in executing the processes described herein, such as the processes described with reference to the figures below. The one or more program may include the app described in further detail below.

The memory 808 can be any type of suitable memory. For example, the memory 808 may include various types of dynamic random access memory (DRAM) such as SDRAM, the various types of static RAM (SRAM), and the various types of non-volatile memory (PROM, EPROM, and flash). In certain examples, the memory 808 is located on and/or co-located on the same computer chip as the processor. In the depicted embodiment, the memory 808 stores one or more programs for executing at least part of the processes described herein, particularly the user device controlled aspects of the processes.

The bus serves to transmit programs, data, status and other information or signals between the various components of the computer system of the controller 810.

The storage device 812 can be any suitable type of storage apparatus, including direct access storage devices such as hard disk drives, flash systems, floppy disk drives and optical disk drives. In one exemplary embodiment, the storage device 812 comprises a program product from which memory 808 can receive a program that executes one or more embodiments of one or more processes of the present disclosure, as will be described further below. In another exemplary embodiment, the program product may be directly stored in and/or otherwise accessed by the memory 808. The storage device 812 may also store video data 820 captured by the one or more cameras 103 of the vehicle 100 and sent to the user device 800 over the cellular network 1000, either from the vehicle 100 or from the remote server 900.

The bus can be any suitable physical or logical means of connecting computer systems and components. This includes, but is not limited to, direct hard-wired connections, fiber optics, infrared and wireless bus technologies. During operation, one or more programs are stored in the memory 908 and executed by the processor.

The user device control system 802 also comprises a user interface 806, which may include an input unit 916. The input unit 916 may include audio, keyboard, mouse, touch-screen and other input capabilities. The operator interface 906 may include audio, image and video output capabilities. The user interface 806 may include a display unit 814, optionally in the form of a touchscreen display, and speakers for outputting image, video and audio data to a user. The user interface 806 allows a user to view video and/or images captured by the one or more cameras 103. In various embodiments, the user interface 806 and the controller 910 allows a user to send control commands to controller 106 of the vehicle control system 102 to control operation of the one or more cameras 103 and sending of video data from the vehicle 100. The control commands may be sent via the remote server 900 or more directly to the vehicle 100.

The controller 810 is operable with the remote communications module 804 to receive video and image data sent over the cellular network 1000, which may be received from the remote server 900 or from the vehicle 100. In some embodiments, the controller 810 is operable with the remote communications module 804 to receive sound data from the vehicle 100 in addition to the video data. The sound data is captured by the one or more microphones 289. In various embodiments, video data (and optionally also sound data) from the vehicle 100 must first be transmitted to the remote server 900 from which video data is then transmitted to the user device 800. The remote communications module 804 may comprise a control unit and a transceiver for transmitting and receiving data over the cellular network 1000. The remote communications module 804 may operate through third generation (3G) or fourth generation (4G) standards or any other telecommunications standard. In various embodiments, the controller 810 is configured to store the video and image data (and optionally sound data) received over the cellular network 1000 in the data storage device 812. In various embodiments, the controller 810 is configured to output video data (and optionally sound data) received from the vehicle 100 over the cellular network 1000 through the user interface 806 to allow a user to view (and optionally hear) outside surroundings of the vehicle 100 and/or the interior of the vehicle 100.

Remote Video Access and Control

In various embodiments, the one or more cameras 103 are configured to capture video data of the outside surroundings of the vehicle 100 and/or the interior of the vehicle 100. Further, the one or more microphones 289 are configured to capture sound data of the outside surroundings of the vehicle 100 and/or the interior of the vehicle 100. The controller 106 is configured to send, e.g. stream, the video data and any sound data over a cellular or other telecommunications network 1000 via a remote communications module 202. The controller 910 of the server 900 and/or the controller 810 of the user device 800 is/are configured to receive the video data and any sound data via the respective remote communications module 804, 904. The controller 910 of the server 900 may receive the video data and any sound data via an internet connection included in the remote communications module 904. The internet connection may be wired broadband access such as DSL, wireless broadband such as satellite or mobile broadband through the cellular network 1000. The controller 810 of the user device 800 may receive the video data and any sound data via an internet connection included in the remote communications module 804. The internet connection may be wired broadband access such as DSL, wireless broadband such as satellite or mobile broadband through the cellular network 1000. In an embodiment, the controller 810 of the user device is a mobile telephone and is able to receive the video data and any sound data through wireless internet connection. The user device 800 may be configured to connect to the remote server 900 (which are themselves remote from each other) in order to receive the video data and any sound data from the remote server 900. In this instance, the remote server 900 is configured to receive the video data and any sound data from the vehicle 100 first and to send the video data to the user device 800.

In various embodiments, the one or more cameras 103 include a plurality of cameras 103 able to capture video data from respective sides of the vehicle 100. The controller 106 may be configured to stitch the video data from respective cameras 103 together in order to provide panoramic video data of most of the outside surroundings of the vehicle or even 360° panoramic surround video data of the vehicle 100. In another embodiment, the controller 106 may be configured to capture and send the video data in the form of a mosaic of video data, with each video of the mosaic corresponding to a view from a respective camera 103. The controller 106 is configured to send or stream the panoramic or mosaic video data from the vehicle 100 over the cellular network 1000 via the remote communications module 202. In an alternative embodiment, the controller 106 is configured to send or stream the video data from the plurality of cameras 103 over the cellular network 1000 via the remote communications module and stitching of the video data to create panoramic video data is carried out by a remote controller, such as the server controller 910 or the user device controller 810. The panoramic video data may include sound data as mentioned above.

In an embodiment, the display unit 914 of the server control system 902 is configured to display the video data, thereby enabling a server operator to view the interior and/or the outside surroundings of the vehicle 100. Further, the server control system 902 may comprise one or more speakers (not shown) to play the sound data. In an additional or alternative embodiment, the display unit 814 of the user device control system 802 is configured to display the video data, thereby enabling a user to view the interior and/or the outside surroundings of the vehicle 100. Further, the user device 800, via the user device control system 802 and speakers (not shown) is configured to play the sound data. The video data and any sound data may be streamed from the vehicle 100 such that the server operator and/or the user is viewing real-time video and can hear any sound data in real time.

In various embodiments, the server control system 902 and/or the user device control system 802 is/are configured to send one or more control commands to the vehicle control system 102. The control commands may be transmitted at least partly over the cellular network. The one or more control commands may be transmitted via the remote communications module 804, 904. In particular, the control commands are able to control the one or more cameras 103 or the video data captured thereby in one embodiment.

Figure 6:
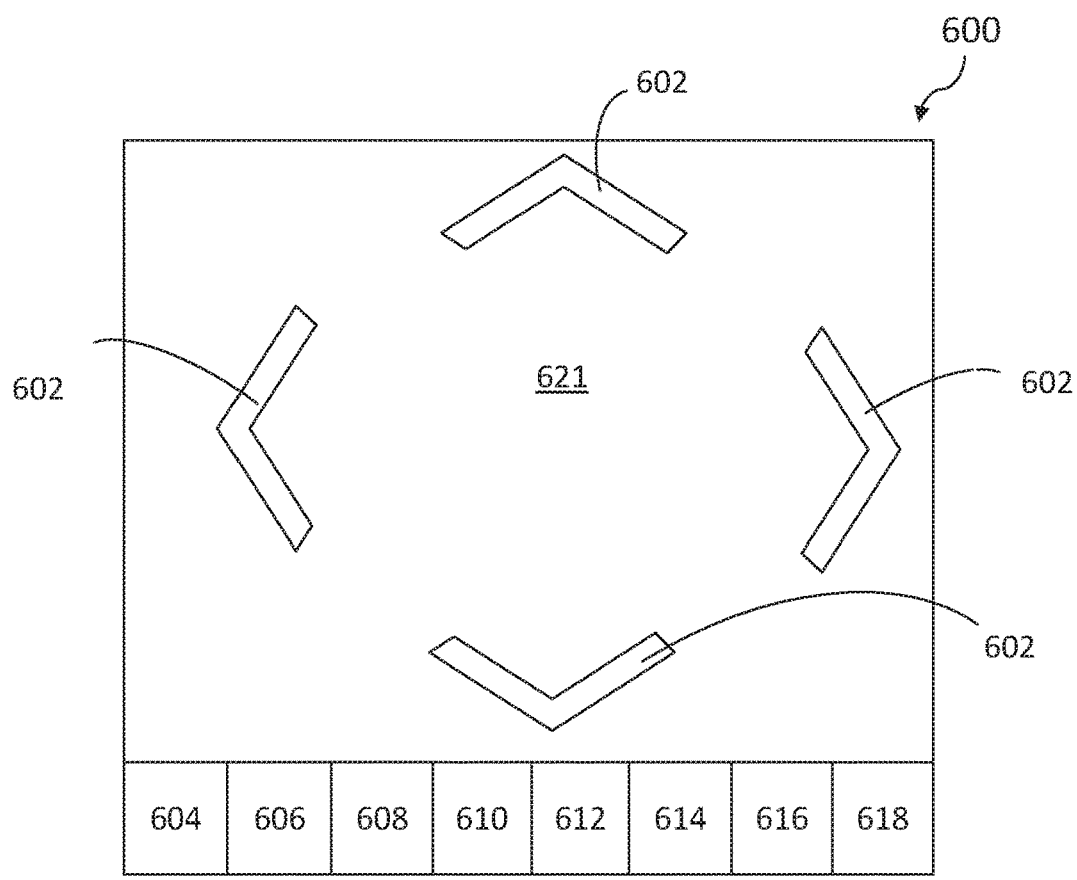
FIG. 6 is a functional block diagram of a graphical user (operator) interface for selecting control commands.

In various embodiments, a graphical user interface 600 as shown in FIG. 6 may be provided for display on a display unit 814, 914 of the remote server 900 or the user device 800. The graphical user interface 600 is configured to display selection graphics 602 to 618 to allow a user or operator to select an appropriate control.

Various such control commands are discussed in the following in accordance with various exemplary embodiments. The various control commands may be provided alone or in any combination.

Wake-Up and Standby Commands

One exemplary control command is a wake-up or video ON command. The wake-up command, when received and processed by the vehicle control system 102, is configured to activate the one or more cameras 103 and to activate sending or streaming of captured video data over the cellular network 1000 to the server control system 902 or the user device control system 802. The wake-up command could be initiated by a user wanting to check on the security of the vehicle, particularly in instances where the vehicle has been parked in a potentially unsecure location such as a public parking lot. Other situations can be envisaged when a remote activated check of a vehicle's surroundings and/or interior would be useful. The wake-up command, when received and processed by the vehicle control system 102, may also be configured to activate the one or more microphones 289 such that sound and video data are sent or streamed over the cellular network 1000.

In particular, a user may operate the input unit 816 of the user device 800 to select the wake-up or video ON command. This may involve launching of an application on the user device 800, which is run by the controller 810. In an embodiment, the wake-up command may be selected within an app being run on the user device 800. The controller 810, responsive to the user input through the input unit 816, is configured to send the wake-up command using the remote communications module 804. The user input may be carried out by operation of a touch-screen display embodying the input unit 816. Alternatively, an operator may operate the input unit 916 of the server 900 to select a wake-up command. This may involve launching of an application on the server 900, which is run by the controller 910. In an embodiment, the wake-up command may be selected within an app being run on the server 900. The controller 910, responsive to the user input through the input unit 916, is configured to send the wake-up command using the remote communications module 904. The user input may be carried out by operation of a touch-screen display embodying the input unit 916.

The vehicle control system 102 is configured to be responsive to the wake-up command, received via the remote communications module 202, to activate the one or more cameras 103 and optionally the one or more microphones 289 and to activate sending of the video data and sound data captured thereby. The user device control system 802 and/or the remote server control system 902 is/are configured to receive the video data via the remote communications module 804, 904. The controller 810 of the user device 800 may be operable to display the video data on the display unit 814 and the controller 910 of the service may be operable to display the video data on the display unit 914. In this way, the user is able to view video data remotely, which is streamed from the vehicle 100. Further, the vehicle 100 is not required to continuously operate the one or more cameras 103 and to send the captured video data. This is able to save data costs as well as vehicle power consumption.

In various embodiments, the server control system 902 and/or the user device control system 802 is/are configured, in conjunction with the input unit 816, 916, so that a user or operator is able to select to turn video OFF. The server control system and/or the user device control system 802 is/are configured to responsively transmit a standby command to the vehicle control system 102. The vehicle control system 102 is configured to be responsive to the standby command to place the one or more cameras 103 (and optionally also the one or more microphones 289) in a standby mode so that video data is not captured and/or the vehicle control system 102 is configured to disable sending of video data. In this way, cellular data is not transmitted when it is not requested by a user to save on data costs and power consumption. Alternatively, the user device control system 802 and/or the server control system 902 is configured to periodically transmit the wake-up command or a similar command indicating that video data should be streamed by the vehicle control system 102 as long as a video selection on the user device 800 and/or the remote server 900 persists. When a selection is made to turn OFF the video, the user device control system 802 and/or the server control system 902 is/are configured to discontinue transmitting the wake-up or similar command. The vehicle control system 102 is configured to respond to the absence of the wake-up or similar command by entering the one or more cameras 103 into a standby mode or disabling sending of video data.

Figure 4:
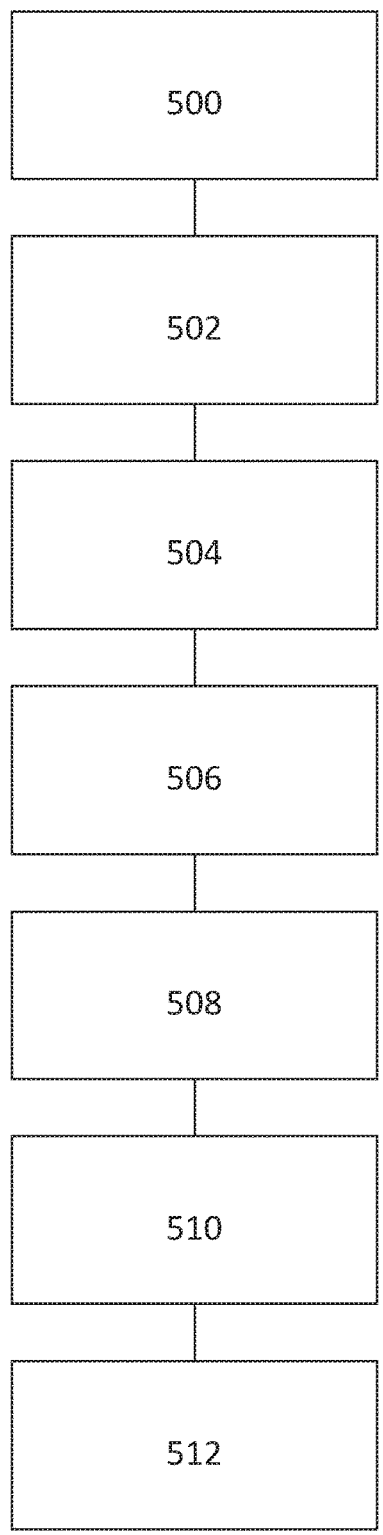
FIG. 4 is a flowchart of a process for transmitting video data to a remote server or a remote user device and activating or deactivating the transmission of video data by one or more vehicle control commands from the remote server or the remote user device, in connection with the vehicle of FIG. 1, in accordance with an exemplary embodiment.

FIG. 4 shows an exemplary flowchart of a process of selectively activating one or more cameras of a vehicle 100 from a remote site.

In step 500, capturing of the video data by the one or more cameras 103 and sending of the captured video data over the cellular network 1000 is in a standby state. It may be that the one or more cameras 103 are in a standby state by video data not being captured by the one or more cameras 103 (i.e. the cameras 103 themselves are on standby) or that the video data is being captured by the one or more cameras 103, but sending of the video data over the cellular network or the telecommunications network 1000 is currently disabled.

In step 502, a user or operator initiates a wake-up or video ON command that is transmitted from the user device 800 or from the remote server 900. The user or operator may initiate such a wake-up command by a selection within a graphical user interface of an application running on the controller 810, 910 (as described further with reference to FIG. 6) or by launching the application itself. The selection within the application may correspond to a graphical button, icon, etc., where the button, icon, etc. represents a selection of viewing of one or more vehicle cameras 103. The selection within the application or launching of the application may be carried out by touchscreen selection, mouse input, keyboard input, etc. The application or app referred to herein may correspond to a computer program being executed by a processor of at least one of the controllers 106, 810, 910.

In step 504, the one or more vehicle cameras 103 are, in response to the wake up command, operated to capture video data. In various embodiments, the one or more microphones 289 are, in response to the wake up command, operated to capture sound data. In certain embodiments, a plurality of video cameras 103 are operated to allow generation of panoramic video data. The video data from each camera 103 may be stitched before or after the video data transmission step 506. Alternatively, the video data may remain unstitched to allow video data from each camera 103 to be separately viewed in various embodiments.

In step 506, the captured video data and any sound data are transmitted to the remote server 900 and/or the user device 800. In embodiments, the video data and any sound date are transmitted at least partly over a cellular network 1000. The video data and any sound data are received and processed at the remote server 900 and/or the user device 800. The processing may involve decompression of the video data and/or stitching of video data from different vehicle cameras 103 to provide a panoramic view. The processing may involve integrating a sound channel including the sound data into the video data to allow for synchronous sound and video replay.

In step 508, the received video data is displayed at the remote server 900 or the user device 800. The remote server 900 and the user device 800 include respective display units 814, 914 that are operable with the respective controllers 810, 910 to display the video data. Further, the remote server 900 or the user device 800 may be operable to reply the sound data through one or more speakers (not shown).

In step 510, the user or operator selects to turn the video off by operation of the input unit 816, 916. Once the selection to turn off the video has been made, receipt, i.e. streaming, of the video data and any sound data is stopped and display of the video data is also stopped. The user may select to turn the video off by operating a touchscreen, mouse, etc. embodying the input unit. In particular, a graphic or icon corresponding to video OFF may be selected, as described further below with reference to FIG. 6.

In step 512, after the user or operator selects to turn OFF the video, capturing of video data by the one or more cameras 103 and sending of the captured video data from the vehicle 100 is returned to standby. In this way, cellular data use is not extended beyond the user's requirements. The server 900 or the user device 800 may return a standby command after the video OFF selection is made. The standby command is transmitted from the user device 800 or the remote server 900 to the vehicle 100 at least partly over the cellular or telecommunications network 1000. Alternatively, the absence of a command from the user device 800 or the server 900 may be interpreted by the vehicle control system 102 as a standby command.

Video Responsive Commands

Another exemplary control command that may be remotely transmitted to the vehicle control system 102 is a video responsive control command, which is responsive to the content of the video. For example, a video enhancement control command may be sent. In various embodiments, the video responsive command is selected from a camera wash command, a camera articulation command, an illumination command, a camera change command, camera low light enhancement command, and a sound activation command. These commands are all responsive to the content of video data being viewed. For example, if the video being viewed is unclear, a camera wash may be required. If the video being viewed is not showing information of relevance, a change of camera or camera articulation may be required. If the video being viewed shows vandalism or theft in progress, the illumination and sound activation may be of assistance. If the video being viewed is too dark, illumination may be required. The illumination command and the sound activation command may also have a theft or vandalism deterrent effect and thus can be considered security related alarms. Similarly, if the video being viewed is too dark, a camera low light enhancement command may be instructed. The low light enhancement command may adjust settings of the camera, such as frame rate, exposure time or frequency sensitivity, to enhance captured video data depending upon the lighting conditions.

The server control system 902 and/or the user device control system 802 may be configured to send such a video responsive control command at least partly over the cellular or telecommunications network 1000 via the respective remote communications module 804, 904. The vehicle control system 102 is configured to receive the video responsive control command via the remote communications module 202. The vehicle controller 106 is configured to be responsive to the control command by running a process to implement the command.

For example, in one embodiment the vehicle controller 106 is configured to respond to a camera wash command by issuing a corresponding control command to the one or more camera washers or wipers 280 to clean the associated camera 103. In various embodiments, the camera wash command transmitted from the remote server 900 and/or the user device 800 may be camera specific, i.e. designates a subset (e.g. just one) of a set of cameras 103 of the vehicle 100 or it may be non-specific. The vehicle controller 106 may be configured to respond to the specific wash command by initiating a wash or wipe cycle of the washers or wipers 280 of the subset of cameras 103. The vehicle controller 106 may be configured to respond to the non-specific wash command by initiating a wash or wipe cycle of the washers or wipers 280 of all of the cameras 103.

In various embodiments, the vehicle controller 106 is configured to respond to a camera articulation command by issuing a corresponding command to the one or more camera articulators 282 to change the field of the view of the associated camera 103. Subsequently, video data captured by the camera 103 will have a different view than before articulation of the camera 103. The vehicle control system 102 is configured to send the video data from the new camera view, which can be received and displayed by the server control system 902 and/or the user device control system 802. In this way, a user or operator is able to control, from a remote location, a view of the camera 103. In various embodiments, the camera articulation command transmitted from the remote server 900 and/or the user device 800 is camera specific, i.e. designates a subset (e.g. just one) of a set of cameras 103 of the vehicle 100.

In various embodiments, the vehicle controller 106 is configured to respond to an illumination command to illuminate a field of view of the one or more cameras 103. In various embodiments, the vehicle controller 106 is configured to be responsive to the illumination command by switching ON the one or more illumination devices 284, 286. The vehicle controller 106 may be configured to switch OFF the one or more illumination devices 284, 286 after a predetermined amount of time or the switch OFF of the illumination devices may be embodied in an illumination OFF command from the remote server and/or the remote user device 800 to which the vehicle controller 106 is responsive. The illumination command transmitted from the remote server 900 and/or the user device 800 may be illumination device specific, i.e. designates a subset (e.g. just one) of a set of illumination device 284, 286 of the vehicle 100 or it may be non-specific such that all illumination devices 284, 286 are designated. For example, a user or operator may be viewing video data captured by a subset (e.g. just one) of a plurality of cameras 103. The user or operator may note that the view from the subset of cameras 103 is insufficiently bright and select an illumination ON input through the input unit 816, 916. In embodiments, the server control system 902 and/or the user device control system 802 is/are configured to respond to the user input by transmitting an illumination device specific illumination control command to light the view of the subset of cameras 103. The vehicle control system, particularly the vehicle controller 106, is configured to respond to the specific or non-specific illumination command by switching ON the corresponding illumination device or devices 284, 286.

In various embodiments, the vehicle controller 106 is configured to respond to a low light enhancement command by adjusting one or more settings of the one or more cameras 103 to enhance video data as capture by the one or more cameras 103 in low light conditions. For example, settings of the camera, such as frame rate, exposure time or frequency sensitivity may be adjusted. The frame rate may be lowered; the exposure time increased or the frequency sensitivity shifted to the infrared region to provide enhanced video data under low lighting conditions. The user or operator may note that the view from the subset of cameras 103 is insufficiently bright and select a low light enhancement command through the input unit 816, 916. In embodiments, the server control system 902 and/or the user device control system 802 is/are configured to respond to the user input by transmitting a low light enhancement control command to capture video data using camera settings optimized for low lighting conditions. The vehicle control system, particularly the vehicle controller 106, is configured to respond to the low light enhancement command by adjusting one or more settings of the one or more cameras 103.

In various embodiments, the vehicle 100 comprises a plurality of cameras 103, each providing a different camera view. The vehicle controller 106 is configured to respond to a camera change command by switching from one or more currently active cameras 103 to one or more other cameras 103 to change the view of video data being transmitted from the vehicle 100. This can be implemented by the vehicle controller 106 being configured to switch OFF one or more of the currently active cameras 103 and switching ON one or more other cameras 103. Additionally or alternatively, the vehicle controller 106 can be configured to capture video data with each of the plurality of cameras 103 and to switch sending video data from one or more cameras 103 to one or more other cameras 103 over the cellular or telecommunications network 1000 via the remote communications module 202. A user or operator is able to select a camera view using the respective input unit 816, 916. The server control system 902 and/or the user device control system is/are configured to respond to the user input by transmitting the camera change command based on the user or operator selection of camera view. The user or operator may, for example, select a left side, right side, front or rear view (or combinations thereof). The vehicle control system 102 is configured to respond to the camera change command by returning the video data corresponding to user's camera view selection or the operator's camera view selection. The controller 810, 910 of the server 900 or the user device 800 is/are configured to render the returned video data to the display unit 814, 914 to show a change of view according to the selection of the user or the operator.

In various embodiments, the vehicle controller 106 is configured to respond to a sound activation command by operating the one or more sound devices or speakers 288 so as to sound the horn, an alarm or speech warning, or the like, to warn third parties away from any security breach of the vehicle 100. The vehicle controller 106 may be configured to sound the warning through the one or more speakers 288 for a predetermined amount of time. Additionally or alternatively, the server control system 902 and/or the user device control system 802 is/are configured to transmit a sound activation OFF command to which the vehicle control system 102 is responsive to switch OFF the sound warning. The server control system 902 and/or the user device control system is/are configured to generate the sound activation OFF command responsive to a corresponding selection by a user or operator through the input unit 816, 916.

Figure 5:
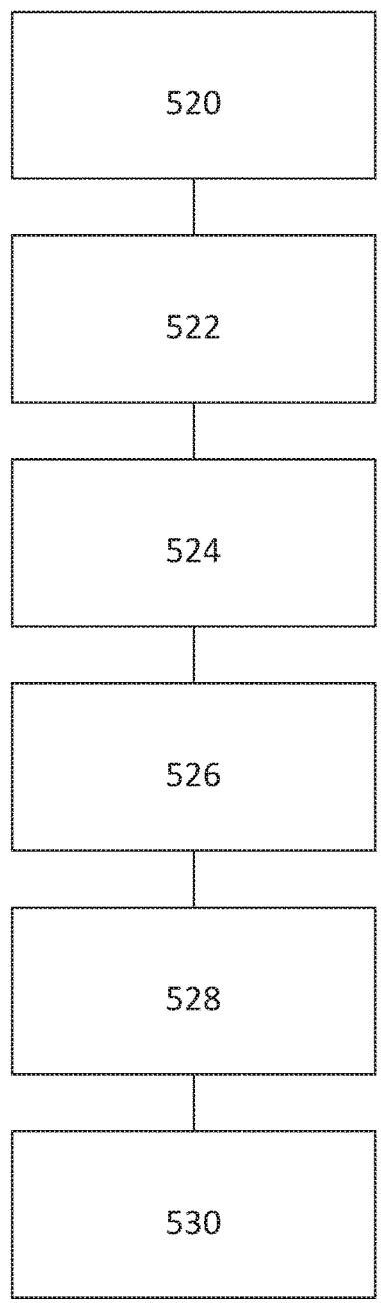
FIG. 5 is a flowchart of a process for transmitting video data to a remote server or a remote user device and transmitting one or more vehicle control commands from the remote server or the remote user device to change a parameter of the video data or the one or more vehicle cameras in connection with the vehicle of FIG. 1, in accordance with an exemplary embodiment.

FIG. 5 shows a flowchart illustrating steps of an exemplary process of transmitting video responsive control commands from a remote user device 800 or a remote server 900 to a vehicle 100.

In step 520, video data, captured by one or more cameras 103 (and optionally sound data captured by the one or more microphone 289), is transmitted from a vehicle 100 at least partly over the cellular or telecommunications network 1000.

In step 522, the video data is received at the remote server 900 and/or the remote user device 800 and displayed on the respective display unit 814, 914. The user or operator is able to view the interior and/or the surroundings of the vehicle on the display unit 814, 914. In various embodiments, the user and/or operator may note a video content issue such as a video quality issue or a problem with the camera view and/or a security issue by viewing the video data.

In step 524, the user and/or operator is able to take action in response to the video content issue and/or the security issue. In particular, the user and/or operator is able to operate the input unit 816, 916, e.g. by way of mouse click, keyboard entry, touchscreen selection, etc., to select a video responsive control action. The video responsive control action may comprise a video quality enhancement action (such as camera wash action, illumination action, and/or sound action) or a video view change action (such as camera articulation action and/or active camera change action) and/or a security response action (such as a sound activation action and/or an illumination action).

In step 526, the remote server control system 902 and/or the user device control system 802 responds to the user or operator selection to transmit a corresponding video responsive control command.

According to step 528, in various embodiments, the vehicle control system 102 changes one or more parameters of the video data or affecting the video data sent from the vehicle 100 to the remote server 900 and/or the remote user device 800. For example, the video data may come from one or more different cameras 103 as a result of a camera change command. In another example, the video data may be captured from one or more cameras that have been articulated as a result of an articulation command. In another example, the video data may come from one or more cameras 103 that have been washed or wiped as a result of a camera wash command. In another example, the video data may from one or more cameras 103 for which a field of view has been illuminated as a result of an illumination command.

According to step 528, in various embodiments, the one or more vehicle speakers are sounded and/or one or more illumination devices 284, 286, are switched ON. These steps can act as a vandalism and theft deterrent.

In step 530, video data is sent from the vehicle control system 102 to the remote server control system 902 and/or the user device control system 802. The remote server control system 902 and/or the user device control system 802 renders and displays the video data on the display unit 814, 914, which can be viewed by a user or operator. Depending on the command, the user or operator may be able to see a better illuminated video, a video enhanced for low lighting conditions, a video taken from a different camera or a different camera angle of the same camera or the quality of the video may have been enhanced by camera washing or wiping. The user or operator is thus able to remotely control the one or more cameras 103, video data from the one or more cameras 103 or other aspects affecting the usefulness of the video data. Since these changes are made at the vehicle end, data costs can be saved. Further, the user or operator may be able to view in the video an effective deterrent of sound activation or illumination device activation.

Amount of Data Command

Another exemplary control command that can be sent from the remote server 900 and/or the remote user device 800 to the vehicle 100 could relate to the amount of video data being sent. In particular, the user or operator may wish to reduce or increase the amount of video data being sent from a vehicle 100 and received by the remote user device 800 and/or the remote server 900. Such control capability is facilitated by an amount of data control command as described in the following.

In various embodiments, the user device control system 802 and/or the server control system 902 is/are configured to allow a user or operator to select, through the input unit 816, 916, one or more parameters relating to an amount of video data received. The input 816, 916 may be configured so that a user can select to increase or decrease the amount of video data received. The input unit 816, 916 is configured to allow a user to select any one or more of data resolution, data compression, color or grayscale, frames per second, number of active cameras 103, etc. in order to allow control of increase or decrease of amount of data.

In various embodiments, the controller 810, 910 of the user device 800 or the remote server 900 is configured to interpret the user or operator input selection and to generate an amount of data control command. The controller 810, 910 is configured to operate in conjunction with the remote communications module 804, 904 to transmit the amount of data control command over the internet and/or the cellular or telecommunications network 1000 to the vehicle control system 102. The vehicle controller 106 is configured to operate with the remote telecommunications module 202 to receive the amount of data control command from the cellular or telecommunications network 1000. The controller 106 is configured to interpret the amount of data control command and to adjust one or more parameters of video data that has been captured by the one or more cameras 103. Depending on the amount of data control command, the controller 106 is configured to change the amount of data transmitted over the cellular or telecommunications network 1000 in order to increase or decrease data usage depending upon user preferences as defined by the amount of data control command.

There are a number of exemplary parameters that may be adjusted to change data usage in transmitting video data from a vehicle 100. In various embodiments, the controller 106 is configured to change the frame rate or frequency of transmission of the video data to change the amount of data being transmitted. In various embodiments, the controller 106 is configured to change the resolution of the video data captured by the one or more cameras to change data usage. Thus, a camera setting may be changed by the controller 106 to change the resolution of the video data being captured. In various embodiments, the controller 106 is configured to change the data rate of the video data transmitted from the vehicle 100. That is, the controller 106 is configured to compress the video data to change the data rate. To do so, settings of an encoder used for data compression are changed. The data rate may be changed from tens of kilobytes per second to at least one and even tens of megabytes per second. In various embodiments, the video data may be captured by the one or more cameras 103 or transmitted, under the instruction of the controller 106, in grayscale or color to change the amount of data. Further, the level of grayscale and color may be changed to change the amount of data being transmitted from the vehicle.

In various embodiments, the amount of data control command is able to adjust a size of a field of view of video data transmitted from the vehicle 100 when received, interpreted and executed by the vehicle controller 106. For example, the data control command may define a number of cameras 103 from which video data is transmitted. In one embodiment, the vehicle 100 may include sufficient cameras 103 to provide substantially 360° surround video data. Such surround video data may be stitched together or be provided by a mosaic of separated videos. The amount of data control command is able to select a subset (e.g. just one) of the cameras 103 to limit the view size, thereby limiting the data usage requirement. That is, the amount of data control command may change from 360° surround video data from a single camera and vice versa. Further, gradations between maximum surround and video data from a single camera 103 are possible, such as video data from two cameras 103 where the vehicle 100 includes four or more cameras 103. In another possibility, the amount of data control command may define a honing of the video data. That is, partial views included in the video data, such as video data from a single camera, may be defined. The amount of data control command may be able to define the size of the partial view when received and executed by the controller 106. According to these various embodiments, the amount of data transmitted by the vehicle 100 is able to be adjusted through an amount of data control command generated as a result of a user or operator selection at a remote server 900 or a remote user device 800.

The amount of data control command allows for control of the amount of data transmitted from a vehicle 100, thereby potentially reducing upstream data costs, as well as potentially reducing downstream data costs at the remote server 900 or the remote user device 800. The data control command also allows a user or operator to increase the amount of data, and thus the quality of the video, on command. Such functionality may be useful if a user or operator notes a security threat as a result of viewing the video data.

In various embodiments, a process for controlling the amount of data used by the network 400 of vehicle 100 and remote server 900 and/or the remote user device 800 is also shown in FIG. 5.

In step 520 video data is streamed or transmitted in real time from the vehicle 100 to the remote server 900 and/or the remote user device 800 at least partly over the cellular network 1000.

In step 522, the video data received at the remote server 900 and/or the remote user device 800 is displayed on the display unit 814, 914. The video data may be substantially 360° surround video data or video data from one, some or all of the front, rear, left side, ride side and interior of the vehicle 100. In the case of surround video data, such as substantially 360° surround video data, the user or operator is able to scroll through the stitched surround view or through respective views of a mosaic of videos by operating the input unit 816, 916.

In step 524, the operator or user selects to change the data usage using the input unit 816, 916. This may be a qualitative selection such as low, medium or high. For a qualitative selection, the controller 810, 910 may access predetermined settings from the memory 808, 908 defining an amount of data transmitted from the vehicle 100. The operator or user may additionally or alternatively be able to select specific data usage parameters for adjustment such as frame rate, view size, grayscale or color, data rate, etc. as described above. The operator or user may make use of a scroll bar, data usage values, buttons, icons, arrows, etc. in order to make the data usage selection.

In step 526, one or more data usage parameters or settings are formulated into one or more data amount control commands by the controller 810, 910. The one or more data amount control commands are transmitted from the remote user device 800 and/or the remote server 900 by operation of the controller 810, 910 in conjunction with the remote communications module 804, 904. The one or more amount of data control commands are received by the vehicle control system 102 from the cellular or telecommunications network 1000. The remote communications module 202 and the vehicle controller 106 operate together to receive the one or more amount of data control commands.

In step 528, the vehicle controller 106 is responsive to the amount of data control command to adjust the amount of data being transmitted over the cellular or telecommunications network 1000 to the remote server 900 and/or the remote user device 800. For example, the controller 106 may change any one or more of the data transmission rate, the video frame rate, the size of the view of the video data, the grayscale or color of the video data, gradation in color or grayscale of the video data or any other parameter relating to the amount of video data transmitted from the vehicle 100. The specific parameters to change may be defined by the amount of data control command. For example, a user or operator may select a cropped view of the video data, a reduced frame rate, etc., which selections will be embodied in the one or more data control commands. Alternatively, the one or more data control commands may be more generic and specify that data usage should be changed and the vehicle controller 106 may determine one or more data usage parameters for change.

The present disclosure thus allows remote control of the amount of data sent over the telecommunication network 1000, thereby allowing user or operator control of data usage as well as video quality, depending upon the circumstance.

Smart Vehicle Video Transmission Control

In various embodiments, any one or more of the vehicle control system 102, the user device control system 802 and the remote server control system 902 include a video data analyzer 107 (shown in FIG. 3 to be included as part of the vehicle control system) configured to analyze the video data from a plurality of cameras 103 to determine activity in a view of a subset (for example, just one) of the plurality of cameras 103. For example, the video data analyzer 107 may be configured to analyze time spaced frames of video data to determine movement in the video data to determine activity in the video data from a subset of the cameras 103.

In various embodiments, the vehicle controller 106 is configured to be responsive to the video data analyzer 107 to adjust the amount of data transmitted from the vehicle 100. For example, should no activity or substantially no activity be determined by the video data analyzer 107, and then the controller 106 can be configured to respond by defining one or more data transmission parameters corresponding to a relatively low amount of video data being transmitted from the vehicle 100. Conversely, should activity be detected or determined by the video data analyzer 107, and then the controller 106 can be configured to respond by defining one or more data transmission parameters corresponding to a relatively high amount of video data being transmitted from the vehicle 100. Any one or more of the parameters described above for adjusting the amount of data transmitted from the vehicle 100 may be utilized. The following exemplary parameters may be adjusted: the size of the view defined by the transmitted video data, the frame rate of the video data, the data rate of the video data (as defined by an encoder for compressing the video data, for example), grayscale or color settings, and the like.

In various embodiments, the video data analyzer 107 is configured to output a direction or location of the determined activity. The vehicle controller 106 is configured to be responsive to the determination of activity and the direction thereof by the video data analyzer 107 and to crop the field of view defined by the video data based thereon. In this way, a field of view of video data may be transmitted from the vehicle 100 based on a determination by the vehicle controller 106 of a relevant part of the video data available from the one or more cameras 103.

In various embodiments, the vehicle controller 106 is configured to be responsive to the determination of activity by the video data analyzer 107 and the direction thereof by transmitting video data from one or a subset of the one or more cameras 103. The one camera 103 or the subset of the plurality of camera 103 selected based on the field of view of that camera and the direction of activity determined by the video data analyzer 107 to ensure the relevant video data is transmitted.

For example, the vehicle 100 may comprise a plurality of cameras 103 and the vehicle controller 106 is configured to select one or a subset of the plurality of cameras 103 based on the direction of activity from the video data analyzer 107. Alternatively, a surround video (e.g. a mosaic of video data from respective cameras 103 or stitched together video data from the cameras 103) may be constructed by the vehicle controller 106 from the video data from the plurality of cameras 103 and the vehicle controller 106 may determine that activity is present in one or more parts of the video data based on the activity determination from the video data analyzer 107. The controller 106 is configured to transmit the video data from the selected one or the subset of cameras 103 or is configured to transmit the one or more parts of the video data, thereby sending activity relevant video data and allowing reduced data usage.

Safety Triggered Video

In various embodiments, the one or more security sensors 166 or the one or more event sensors 167 are configured to output a trigger signal. The one or more security sensors 166 may comprise a door sensor configured to output a trigger signal when one or more of the doors 101, 110 have been opened and the vehicle doors 101,110 are in a locked state (thereby indicating a break-in). The one or more security sensor 166 may comprise a trunk, gate or hood sensor configured to output a trigger signal when the trunk or gate 101, 111 has been left open. The one or more security sensors 166 may comprise a key fob copy sensor configured to determine a counterfeit key fob. The one or more security sensors 166 may comprise a force sensor such as a vibration sensor or such as an accelerometer configured to output a trigger signal when a force is applied to the vehicle 100 indicative of a potential break-in or vandalism of the vehicle 100. The one or more vehicle cameras 103 may also be comprised in a security sensor 166. Specifically, the video data analyzer (also referred to as a theft event analyzer) 107 may be configured to analyze the video data for activity and based on a determination of duration and/or proximity of the activity be configured to output a trigger signal.

In various embodiments, the one or more event sensors 167 may also output a trigger signal. The one or more event sensors 167 are operable with an event sensing module run on the vehicle controller 106 to determine an event (e.g. in which the vehicle contacts another vehicle or object) and to responsively output the trigger signal.

In various embodiments, the vehicle controller 106 is configured to receive the trigger signal and respond thereto by activating the one or more cameras 103 to capture video data (if not already activated) and to initiate transmission of a safety event notification signal by using the remote communications module 202. Further, the one or more microphones 289 may be activated to capture sound data. The vehicle controller 106 is configured to transit the video data and/or the safety event notification signal and any sound data at least partly over the telecommunications or cellular network 1000.

A vehicle event, attempted vandalism or theft may be determined by the one or more safety sensors 166 or the one or more event sensors 167 (e.g. that may detect contact between the vehicle and another vehicle or object). Such events are referred to herein as safety events. The vehicle controller 106 is responsive thereto by initiating video streaming and/or video data recording.

In various embodiments, the server controller 910 and/or the user device controller 810 is/are configured to be responsive to a safety event notification signal by displaying a corresponding notification on the display unit 814, 914. The notification on the display unit 814, 914 may comprise an initiate video selection graphic, which when selected by way of the input unit 816, 916, causes initiating of display of video data on the display unit 814, 916 and play of any sound data on one or more speakers (not shown). The video data displayed may be substantially 360° surround video (e.g. a mosaic of video data or stitched video data). The video data may come from internal and/or outside video cameras 103. Further, the sound data may come from internally directed and/or externally directed microphones.

In various embodiments, the server controller 910 and/or the user device controller 810 is/are configured to initiate recording of the video data in the respective data storage device 812, 912. The sound data may also be recorded. The recoding of the video data may be initiated automatically for safety events, i.e. as a predetermined step of a program being run by the controller 810, 910, or it may first require user or operator authorization. To obtain such authorization, the controller 810, 910 is configured to prompt, though the display unit 814, 914, a begin recording selection graphic 616 (or other selectable input) via the input unit 816, 916.

In various embodiments, the vehicle controller 106 is configured to record the video data (and any sound data) in the data storage device 178 in response to the trigger signal. The data storage device 178 may be a non-volatile storage device as discussed above. The data storage device 178 may be capable of recording or storing at least 1, 5, 10, 15 or 30 minutes of the video data from the one or more cameras 103 or at least 1 hour of the video data. The data storage device 178 is thus able to record the video data captured over a sufficient period of time corresponding to the vehicle safety event, e.g. vandalism, theft, other event, or the like.

In various embodiments, the vehicle controller 106 is configured to change one or more parameters of the video data in response to the trigger signal. For example, the controller 106 may be configured to change the settings of the video data to default settings. In various embodiments, the controller 106 is configured to set an appropriate frame rate for the video data either as captured or as transmitted. In various embodiments, the controller 106 is configured to set an appropriate data rate for the video data as transmitted. In various embodiments, the controller 106 is configured to set the video data to be captured or transmitted in color. In various embodiments, the controller 106 is configured to set the resolution of the video data either as captured or as transmitted. The various default settings ensure sufficient video data quality during a safety event so that real/time or subsequent display of the video data is useful in identifying the events and the perpetrator(s).

In various embodiments, the vehicle controller 106 is configured to be responsive to the trigger signal and to the video data analyzer 107 to transmit activity specific video data. In particular, the video data analyzer 107 is configured to output an indication of direction of the activity. The vehicle controller 106 is configured to transmit video data from one or more cameras 103, being one of a plurality of vehicle cameras 103 or a subset of the plurality of vehicle cameras 103, having a field of view including a location of the indicated direction of activity. The activity specific transmission of data has been discussed in more detail above and is applicable to the present embodiments.

In various embodiments, the vehicle controller 106 is configured to determine whether a connection to a telecommunications network 1000 is available in response to the trigger signal. If not, the vehicle controller 106 is configured to record video data captured by the one or more cameras 103 in the vehicle data storage device 178. In embodiments, the vehicle controller 106 is configured to record the video data in the vehicle data storage device irrespective of whether a telecommunications network 100 is available. In various embodiments, the vehicle controller 106 is configured to transmit the recorded video data from the vehicle 100 at least partly over the telecommunications or cellular network 1000 when the connection to the telecommunications or cellular network 1000 becomes available. In other embodiments, the recorded video data need not be transmitted over the cellular network 1000 by the vehicle controller 106. The recorded video data can be transferred to another computing device, e.g. by removing an SD card embodying the vehicle data storage device 178, and/or viewed on the vehicle display screen 191. The video data may be transmitted from the vehicle 100 to the remote server 900 and/or the user device 800 either from the vehicle controller 106 or from the computing device. The server controller 910 and/or the user device controller 810 is configured to receive the video data and display the video data through the display unit 814, 914. In various embodiments, the vehicle controller 106 is configured to first transmit over the cellular or telecommunications network 1000 a safety event notification signal. The server controller 910 and/or the user device controller 810 is configured to display a prompt for the user or operator in response to the safety event notification signal. The prompt invites the user or operator to select to receive the video data of the safety event. Assuming a selection is entered through the input unit 816, 916 corresponding to a request to receive the video data, the controller 810, 910 is configured to transmit a control command to the vehicle control system 102 for transmission of the recorded video data. The vehicle controller 106 is responsive to the control command for transmission of the recorded video data by sending the recorded video data at least partly over the cellular or telecommunications network.

In various embodiments, recording of the video data in the vehicle data storage device 178 may continue until a predetermined time has elapsed (e.g. 1 to 30 minutes, in one embodiment, although this may vary in other embodiments) or the vehicle controller 106 may be configured to determine when the safety event has come to an end. For example, the video data analyzer 107 may be configured to determine activity as described above. When a determination is made of a lack of activity, a corresponding activity output is provided to the controller 106. The controller 106 is configured to discontinue recording of the video data based on the determination of a lack of activity. In other alternatives, the one or more security sensors 166 or the one or more event sensors 167 may provide an output indicative of safety event end to which the vehicle controller 106 is responsive.

The video data corresponding to the safety event may be labelled as such when stored to prohibit overwriting and/or to assist subsequent playback. For example, the vehicle controller 106 may be configured to record video data (for example, all video data) captured by the one or more cameras 103 and to do so in a recording loop on the vehicle data storage device 167. The vehicle controller 106 may be configured not to overwrite the video data labelled as a safety event (or other scheme for prohibiting overwriting of a selected part of the video data). The recording loop can, therefore, exclude the part prohibited from recording.

In various embodiments, the recorded video data is able to be viewed (and any sound data heard) at the vehicle 100. In particular, the controller 106 is configured to display the recorded video data on the vehicle display screen 191 and to output any sound data through one or more vehicle speakers (not shown), such as on request through a user input such as through a touchscreen input on the display screen 191. As such, the recorded video data can be played back at the vehicle 100, as well as through a remote user device 800 and a remote server 900.

Figure 7:
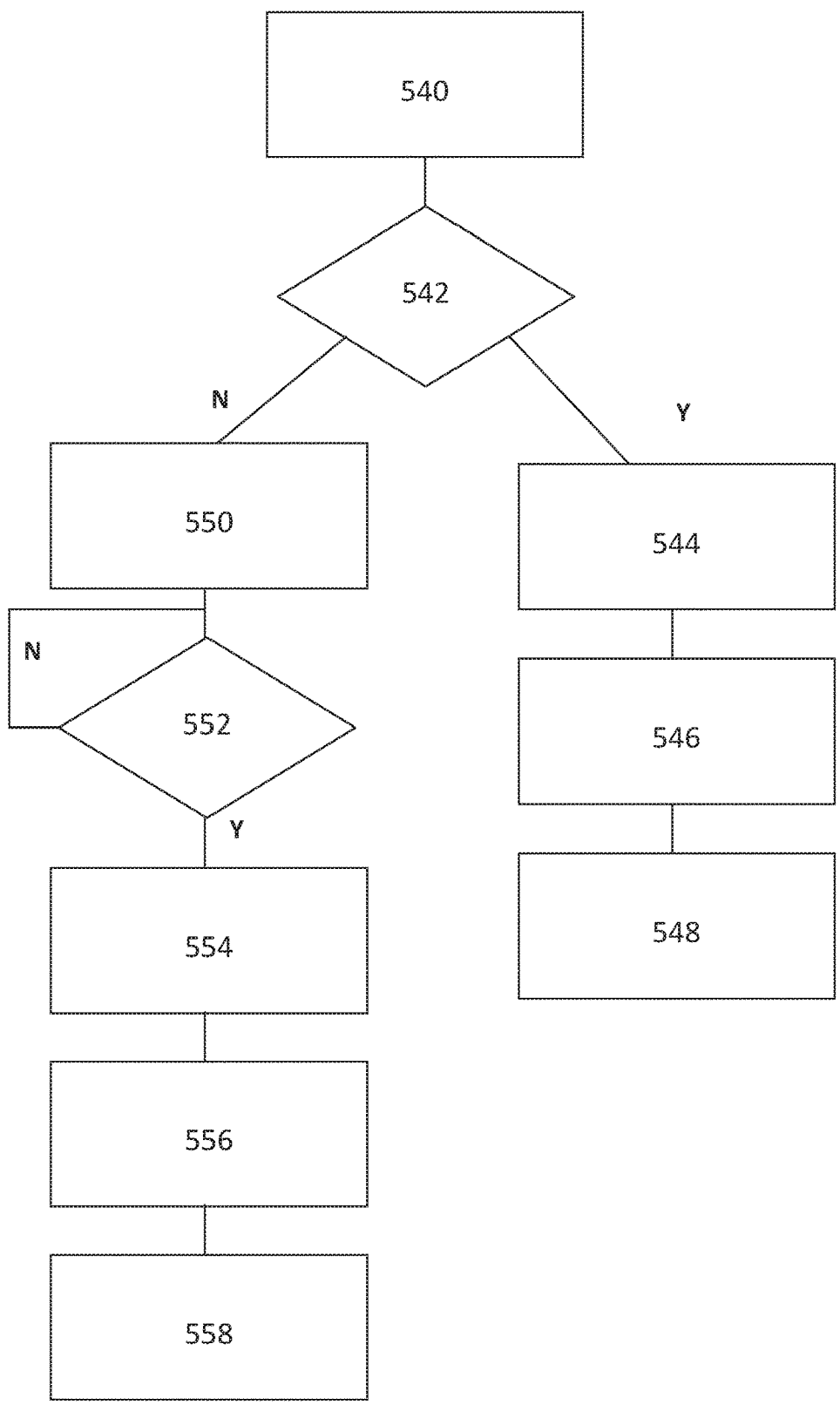
FIG. 7 is a flowchart of a process for transmitting video data in response to a trigger signal, in connection with the vehicle of FIG. 1, in accordance with an exemplary embodiment.
Figure 8:
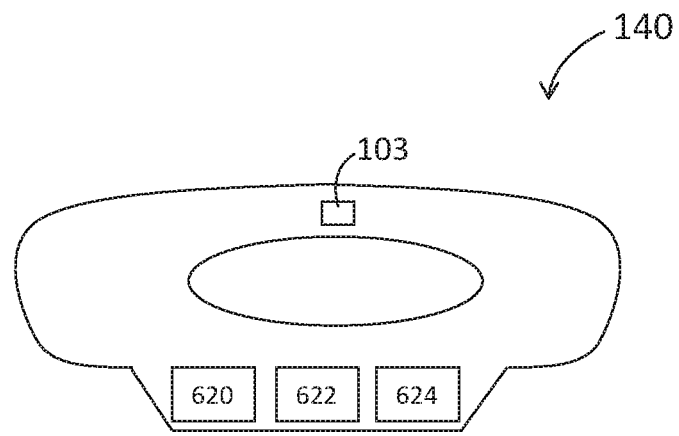
FIG. 8 is a schematic diagram of an in-vehicle video data transmission button arrangement, in accordance with an exemplary embodiment.

FIG. 7 shows a flowchart of a process according to various embodiments of the present disclosure.

In step 540, an output trigger signal is generated. The output trigger signal may be generated by, in cooperation with the vehicle controller 106, one or more security sensors 166 based on vibration, door/trunk/gate/hood open condition, activity around the vehicle 100 as determined by the video data analyzer 107, key copy determination, or the like. Further, the trigger signal may be responsive to an event as indicated to the vehicle controller 106 by the one or more event sensors 167. The output trigger signal may, when instigated by the one or more security sensors 166, cause the vehicle's alarm system to become active, which may include a loud sound, such as a siren sound, being issued through the sound device 188 and/or activation of one or more illumination devices 284 such as flashing thereof. The output trigger signal may, when instigated by the one or more event sensors 167, cause the vehicle's event response to become active such by releasing one or more air bags.

In steps 542 to 550, the output trigger signal also leads to transmission of video data (and optionally sound data) to a user device 800 and/or a remote server 900 so that the safety event can be viewed in real time or substantially real time when a connection is available and so that a recording of the safety event can be played back when a connection becomes available.

In step 542, a determination is made, via the vehicle controller 106, as to whether a connection to a telecommunications or cellular network 1000 is available. If a connection is available, then the process proceeds to stream the video (and optionally) data according to steps 544 to 546. If no connection is available, then the process proceeds to record the video (and optionally sound) data and subsequently upload the video data when the connection to the telecommunications or cellular network 1000 becomes available. The recording of video data may proceed without dependence on determination of no connection being available.

In step 544, when a connection to the network 1000 is available, the vehicle controller 106 is configured to transmit, using the remote communications module 202, a safety event notification to the remote server 900 and/or the user device 800. The remote server controller 910 and/or the user device controller 810 is/are configured to receive the safety event notification and to display an invitation to the user or operator to accept a video streaming request relating to the safety event. Video data may be recorded in the data storage device 178, 812, 912 of any one of the vehicle 100, the remote server 900 and the user device 800 in addition to the video data being streamed.

When the user or operator accepts the video streaming request, and according to step 546, the vehicle controller 106 is configured to stream video data captured by the one or more vehicle cameras 103 to the remote server 900 and/or the user device 800.

The server controller 910 and/or the user device controller 810 are configured to receive the video data and display the streamed video data on the display unit 814, 914. Sound data may also be replayed. The user or operator is thus able to view the safety event in real time. Further, the user or operator can trigger control commands through the input unit 816, 916 as discussed above and as detailed further with reference to FIG. 6. For example, control commands corresponding to sound activation, low light enhancement, illumination activation, video data record activation, camera wash activation, camera articulation activation may all be useful. Further, video data corresponding to the safety event may be stored in the data storage device 178, 812, 912 of any one of the vehicle 100, the remote server 900 and the user device 800. The video data corresponding to the safety event may be labelled as such when stored to prohibit overwriting and/or to assist subsequent playback.

If a determination is made that no connection is available in step 542, the vehicle controller 106 is configured to commence recording video data (and sound data) in step 550. The video data continues to be recorded until safety event end time. The safety event end time may be determined by a predetermined time having elapsed from the trigger signal or until the video data analyzer 107, or the sensors 166, 167 indicate that activity has finished. A safety event occurs from the trigger signal to the safety event end time. The recorded video data may be labelled in the data storage device 178 as a safety event so that the vehicle controller 106 is able to prohibit overwriting of the safety event video data. The step 550 of recording video data may take place independent of the determination of whether a connection is available.

Optionally, the process continues to check for a network connection in step 552. Once a connection is available, the video data including the safety event, and labelled as such in the data storage device 178, is uploaded or otherwise transmitted to the remote server 900 or the user device 800 in step 556. The video data is transmitted at least partly over the cellular or telecommunications network 1000 from the vehicle 100. The recorded video data need not necessarily be subsequently transmitted to the remote server 900 by the vehicle controller 106.

Before transmitting or uploading the video data in step 556, a safety event notification signal may first be transmitted over the cellular or telecommunications network 1000 in step 554. The safety event notification 554, when received by the server controller 910 or the user device controller, may cause the respective controller 810, 910 to display a prompt on the display unit 814, 914. The prompt may comprise an invitation to the user or operator to request, through the input unit 816, 916, to upload or other transmission of the video data.

In step 558, the video data transmitted to the remote server 900 and/or the user device 800 is displayed on the display unit 814, 914 under the control of the controller 810, 910.

The present disclosure thus allows prompt notification, a record of and real-time view of theft and vandalism attempts and/or other vehicle events that are activated in an automated, sensor initiated way. These features may assist in reducing crime and identifying causes of vehicle events.

User (Operator) Interface

The user device control system 802 and/or the server control system 902 may include a program, e.g. an app, stored on the respective memory 908, 808. The program, when run by the controller 910, 810 is able to implement the various functions of the remote server 900 and the remote user device 800 that have been described above, particularly with reference to FIGS. 4, 5 and 7, such as receiving video data and notifications from the vehicle 100, recording the video data, generating control commands and transmitting the control commands to the vehicle 100. The app is also able to implement the further server and/or user device aspects of the present disclosure detailed below with reference to FIG. 10. Further, the program is configured to generate a graphical user interface 600 that is displayed on the display unit 814, 914 and to handle operator and/or user inputs through the input unit 816, 916, thereby allowing the control command selections to be made that have been described in the foregoing. It is to be understood that the input of control commands by using a graphical user interface 600, as described below, is merely exemplary. One, some or all of the inputs allowed by the graphical user interface 600 described below may be achieved by other input devices such as mechanical buttons.

An exemplary graphical user interface 600 is shown in FIG. 6, which may be displayed on the display unit 814, 914 of the remoter server 900 or the user device 800. This graphical user interface 600 is particularly described with respect to the remote server 900 or the user device 800. However, such a graphical user interface 600, and the various control functions allowed by it, may also be included within the vehicle 100, and displayed on the vehicle display screen 191.

In various embodiments, the graphical user interface 600 includes a video display portion 621. The video display portion 621 constitutes a major part of the graphical user interface 600 and defines an area in which the video data captured by the one or more vehicle cameras 103 is displayed.

In various embodiments, the graphical user interface 600, generated by the program run on the controller 810, 910, is able to display substantially 360° surround video data as a mosaic of videos from respective cameras 103 or a video stitched together from the video data of each camera 103, as has been indicated in the foregoing. A mosaic of videos can be displayed in the display portion 621 by way of a split screen, with each part of the display portion displaying video data from a respective camera 103. The display portion 621 may show video data from respective cameras 621, with surround video data able to be viewed by successively showing video data from different camera 103. Toggling between camera views may be carried out automatically by the controller 810, 910 or it may be user or operator controlled as described below. Alternatively, the display portion 621 may show a stitched together display of video data from plural cameras 103.

The graphical user interface 600 comprises one or more selection graphics 602, 604, 606, 608, 610, 612, 614, 616 that can be selected through the input unit 816, 916. The selection graphics 602, 604, 606, 608, 610, 612, 614, 616 allow for user or operator selection of control commands to be generated. The input unit 816, 916 may be embodied as a mouse, a keyboard, a touchscreen, and the like.

In various embodiments, one or more directional selection graphics 602 are provided as part of the graphical user interface 600. In the shown embodiment, the directional selection graphics 602 are provided as one or more arrows 602. However, other graphics are possible such as one or more scroll bars. The one or more directional selection graphics 602 allow, in one use, a user or operator to control a viewing direction within a substantially 360° surround video sent from the vehicle 100 and displayed in the display portion 621. The controller 810, 910 is responsive to a selection of the one or more directional selection graphics 602 to change the view accordingly in the display portion 621 of the graphical user interface 600. The directional selection graphics 602 may allow changing view within a stitched together panoramic video from plural cameras 103 or toggling between respective camera views.

In various embodiments, a camera wash or wipe selection graphic 604 is included in the graphical user interface 600. The camera wash selection graphic 604 allows a user or operator to select generation of a camera wash or wipe command as discussed above.

In various embodiments, the graphical user interface 600 includes a camera change selection graphic 610 corresponding to the controller 810, 910 displaying in the display portion 621 a view from one or a subset of a plurality of the vehicle cameras 103. The camera change selection graphic 610 may include a plurality of further selection graphics (not shown) each corresponding to a particular one or subset of the plurality of vehicle cameras 103. In one possibility, the vehicle control system 102 is configured to transmit video data from each of the plurality of cameras 103. In this possibility, the server or user device controller 810, 910 is configured to display the camera view according to the user or operator selection of the camera change selection graphic 610 through the input unit 816, 916. In another possibility, the server or user device controller 810, 910 is configured to transmit a camera change command depending on the user or operator preference selected using the camera change selection graphic 610 and the input unit 816, 916. The vehicle control system 102 is configured to respond to the camera change command and transmit video data according to the selected camera 103, as described above.

In various embodiments, an illumination device selection graphic 608 is included in the graphical user interface 600. The illumination device selection graphic 608 allows a user or operator to select to have the controller 810, 910 generate an illumination device control command as discussed above. The illumination device selection graphic 608 is configured to allow an illumination device ON command and optionally also an illumination device OFF command. The illumination device selection graphic 608 may also include a plurality of further graphics (not shown) corresponding to each of a plurality of vehicle illumination devices 284 to allow for one or a subset of each of the illumination devices 284 to be turned ON and optionally also OFF depending on the user or operator selection through the input unit 816, 916. The controller 810, 910 is configured to generate an illumination device 284 specific control command corresponding to the selection made. The ON and OFF control commands have been described further above.

In various embodiments, a low light enhancement selection graphic (not shown) is included. The low light enhancement selection graphic allows a user or operator to select to have the controller 810, 910 generate a low light enhancement control command as discussed above.

In various embodiments, a camera articulation selection graphic 606 is included in the graphical user interface 600. The camera articulation selection graphic 606 corresponds to the controller 810, 910 generating a camera articulation control command as discussed above, when selected through the input unit 816, 916. The camera articulation selection graphic 606 may include a plurality of further selection graphics (not shown) that allow a user to select a camera 103 for articulation and/or a direction of articulation (e.g. left or right or up or down). The controller 810, 910 is configured to generate a control command corresponding to the articulation selection made.

In various embodiments, a sound activation selection graphic 612 is included as part of the graphical user interface 600. The sound activation selection graphic 612, when selected through the input unit 816, 916, corresponds to the controller 810, 910 generating a sounds activation control command as described above.

In various embodiments, the graphical user interface 600 includes a wake-up or video ON selection graphic 614. When the wake-up or video ON selection graphic 614 is selected through the input unit 816, 916, the remote server controller 910 or the user device controller 810 is configured to generate and transmit a wake-up or video ON control command to the vehicle control system 102, thereby initiating transmission of video data from the vehicle 100 to the remote server 900 or user device 800. The wake-up or video ON selection graphic 614 may also be deselected to allow a user or operator to turn OFF transmission of video data from the vehicle 100.

In various embodiments, the graphical user interface 600 includes a video size selection graphic 618. The video size selection graphic 618 may include a plurality of further graphics to allow the size of the field of view to be selected. The video size selection graphic 618 is operable to allow a user or operator to select the size of the field of view through the input unit 816, 916. The server controller 910 or the user device controller 810 is configured to receive the user or operator selection and generate a corresponding control command as described above.

In various embodiments, the graphical user interface 600 includes a record selection graphic 616, which, when selected through the user input 816, 916, begins or ends recoding of video data in the data storage device 812, 912.

It will be appreciated that the user interface 600 may include one, some or all of the various graphics 602 to 618. Further, although describe here as a graphical user interface, other user interfaces are possible such as command line, drop down box, etc. The user may be presented with various control selection possibilities through other non-graphical user interfaces.

In various embodiments, the user interface of the present disclosure allows a number of control commands to be transmitted through a remote user device 800 or a remote server 900 to implement many useful functions described herein, including data usage control, security features control, video quality control, view selection, etc. These functions may be achieved through a coherent and intuitive user interface.

Video Transmission Button

In various embodiments, a video transmission button 624 is provided that allows for a video transmission, which may be included as part of a conference, to an operator of the remote server 900. The video transmission button 624 may also allow for transmission of sound data captured by the one or more microphones 289. The button 624 may be included as part of the vehicle 100 or as part of a key fob or key fob app. The video transmission button 624 utilizes video data from one or more cameras 103 as the source of video data for the video transmission. The one or more cameras 103 may comprise one or more cameras 103 having the outside surroundings in their field of view and may optionally include a camera 103 having the interior of the vehicle 100 in its field of view. The one or more microphones 289 may also capture sound data from the outside surround and/or the interior of the vehicle 100. The video data for the video transmission may constitute substantially 360° surround video data or otherwise video data patched together from more than one camera 103. The video transmission button 624 may be useful in the event of an event, theft or other emergency situation to allow an operator at the remote server 900 to assist one or more occupants of the vehicle with provision of emergency and other services.

Figure 9:
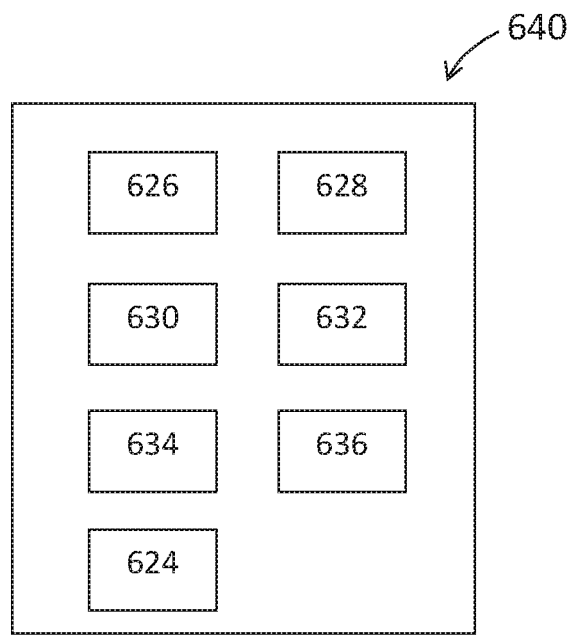
FIG. 9 is a schematic diagram of a key fob button arrangement or a graphic user interface button arrangement including a vehicle data transmission button, in accordance with an exemplary embodiment.

In one example shown in FIG. 9, the rear view mirror 140 includes the video transmission button 624, which is an emergency button in this embodiment. The rear view mirror can, but need not, also include any one of a camera 103 for capturing video of the interior of the vehicle 100 (and particularly of the driver), a non-emergency conference button 622 and a call button 620. The emergency video transmission button 624 places a priority connection that is given higher priority at the remote server 900 than a connection initiated by the non-emergency conference button 622. The non-emergency conference button 622 allows for a lower priority conference with an operator of the remote server 900, who may provide turn by turn directions and other assistance. The call button 620 allows various voice commands to be communicated to the vehicle control system 102 to contacts other than operators of the remote serer 900.

The buttons 620, 622, 624 may be in wired communication with the controller 106. The buttons, when selected by a user, may generate a corresponding signal that is sent to the controller 106. The controller 106 is configured to respond to the signal by executing the associated function such as placing a conference call with an operator of the remote server 900 or placing some other telephone call.

The arrangement of buttons 620, 622, 624 on the rear view mirror 140 is merely exemplary. The one or more buttons 620, 622, 624, particularly the emergency button 624, may be located elsewhere in the vehicle 100 such as on a dashboard or as a graphic on the display screen 191.

Figure 10:
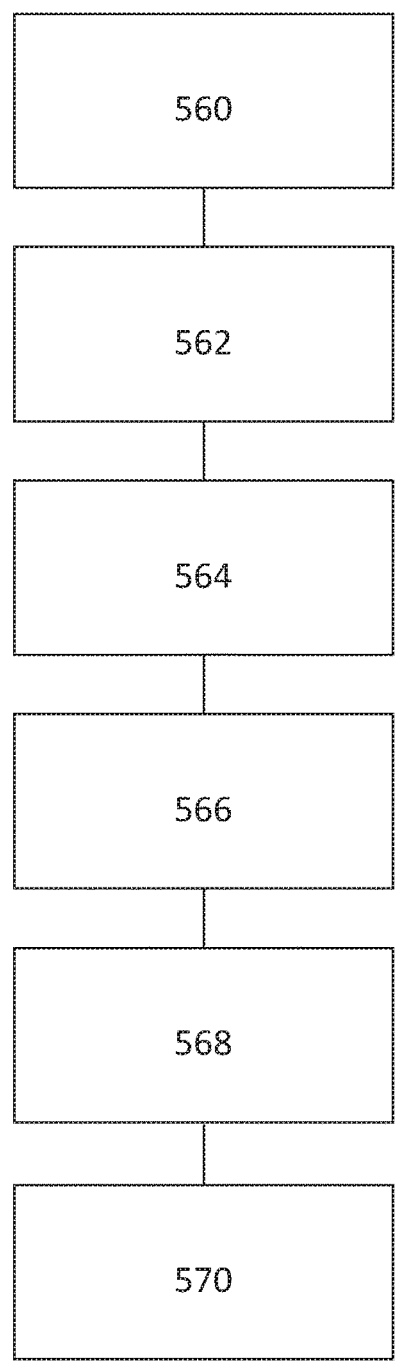
FIG. 10 is a flowchart of a process for transmitting video data to a remote server for viewing by an operator, in connection with the vehicle of FIG. 1, in accordance with an exemplary embodiment.

Additionally or alternatively, the emergency button 624 may be included on as a button on a key fob or on a key fob app 640, as shown in FIG. 10. In FIG. 10, the key fob or key fob app includes the emergency button 624, thereby allowing video transmission to an operator (which may be included as part of a conference call with the operator) of the remote server 900 to be initiated from outside of the vehicle 100. The key fob or key fob app 640 may include any one or more of the following further buttons: ignition start and optionally stop buttons 626, 628, door lock and unlock buttons 630, 632, sound and light activation and deactivation buttons 634, 636.

In the example of a key fob, the buttons 624 to 636 may be provided as mechanical buttons. The key fob 640 may be configured to generate a wireless signal representative of a button pressed. The wireless signal, such as an infrared signal, is receivable by the vehicle controller 106 via the remote communications module 202. The vehicle controller 106 is configured to execute a control operation to perform the operation associated with the button pressed such as unlocking the doors 101, 110, starting the ignition, switching on the sound device 188 or the one or more illumination devices 284, 286.

In the example of a key fob app, the buttons 624 to 636 may be provided as a graphical button displayed on a remote and portable user device 800, such as a smart mobile telephone or tablet. The controller 810 of the user device 800 is configured to generate and transmit a wireless signal representative of one of the buttons 624 to 636 selected by a user. The buttons 624 to 626 may be selected through the input unit 816 in the form of a touchscreen. The user device controller 810 is configured to generate a wireless signal, either in the form of direct line of communication such as an infrared signal, or through the telecommunications or cellular network 1000, which is receivable by the vehicle controller 106 via the remote communications module 202. The vehicle controller 106 is configured to perform a control operation to execute the function associated with the received wireless signal such as unlocking the doors 101, 110, starting the ignition, switching on the sound device 188 or the one or more illumination devices 284, 286.

In various embodiments, when the video transmission button 624 (which may be an emergency button) is selected by a user or operator, a corresponding signal is sent to the vehicle controller 106. The vehicle controller 106 is configured to capture video from one or more cameras 103 (one or more outside cameras 103 and/or one or more interior cameras 103) and stream or otherwise transmit the captured video (and any sound data captured by the one or more microphones 289) to the remote server 900 at least partly over the telecommunications or cellular network 1000 via the remote communications module 202. The vehicle controller 106 may be further configured to open a two-way audio channel at least partly over the cellular or remote telecommunications network 1000 to allow the operator and one or more occupants of the vehicle 100 to talk to one another. The transmission of video data and the two-way audio channel provides for a conference between the operator and the vehicle occupant that includes video data. Sound data from outside the vehicle 100 may also be transmitted.

It is envisaged that two-way video transmission could also be established such that the operator may be viewed in the vehicle display 191.

The remote server 900 is configured to display the video data and optionally to play the audio through one or more speakers (not shown) such that the operator can take part in the conference. The operator may be able to see the vehicle surroundings and/or the vehicle interior through the video transmission displayed on the display unit 814, which may be enough to be able to establish the assistance required. Thus, even if the emergency button 624 is selected from outside the vehicle 100, e.g. through the key fob or key fob app 640, the video transmission may be sufficient to establish that emergency services are required. In fact, an audio and video conference may not be required. Mere transmission of the video data captured by the one or more cameras 103 and communicated to the remote server 900 may be sufficient to alert the operator to the service needed.

In various embodiments in which the emergency button 624 is provided as part of a key fob app run on the user device 800, the video data may be transmitted from the vehicle 100 as explained above, but the conference between the operator and the user may take place through the user device. That is, the two-way audio channel is connected between the user device 800 and the remote server, optionally over the cellular or telecommunications network 1000 and the video transmission is connected between the vehicle 100 and the remote server 900.

In various embodiments, the vehicle controller 106 is configured to store the captured video data (and any sound data) in the data storage device 178 in response to the video transmission button 624 being selected.

In various embodiments, the remote server control system 902 is configured to store on the data storage device 912 the video data transmitted in response to the video transmission button 624 being selected. Any audio transmissions may also be stored on the data storage device 912 including sound data from the conference between operator and user and/or sound data from the vehicle's outside surroundings.

The remote server 900 is also configured to generate and transmit operator selected control commands, as described above.

FIG. 11 shows a flowchart describing a process for transmitting video data to a remote server 900 in response to a video selection button 624 being selected according to various embodiments.

In step 560, a user selects the video transmission button 624. The video transmission button 624 may be included on a key fob 640, a key fob app 640 or in the vehicle 100, as described above.

In step 562, a video transmission request signal is generated and transmitted to the vehicle controller 106 in response to the video transmission button 624 being selected. The signal may be transmitted via wired connection, line of sight wireless connection (e.g. infrared) or telecommunications network connection.

In step 564, the video transmission request signal is received by the vehicle controller 106, via the remote communications module 202. The vehicle controller 106 responds to the received signal by operating the one or more cameras 103 to capture video data and by streaming the video data over the telecommunications network 1000 via the remote communications module 202.

In step 566, the video data is received by the remote server 900 via the remote communications module 904. The remote server 900 displays the received video data on the display unit 914, which is viewed by the operator. The operator may be able to control the video data using any one of the control selections shown in FIG. 6 and discussed above. For example, when plural camera views are streamed, such as 360° video data, the operator is able to change the camera view.

In step 568, the vehicle occupant may also be placed in conference with the operator via establishment of a two way audio channel. To do so, the vehicle 100 includes one or more interior speakers (not shown) and a microphone (not shown) and the remote server includes one or more speakers (not shown) and a microphone (not shown) for the operator. The operator is thus able to have an interactive conversation with the vehicle occupant, as well as to view the vehicles outside surroundings and/or interior through the streamed video data. The operator is able to take suitable action based on the video data and the optional conference call. For example, the appropriate emergency services can be informed. The GPS of the vehicle 100 is also communicated to the remote server such that this information can be passed on to the emergency service(s).

In step 570, the remote server control system 902 and/or the vehicle control system 102 is configured to record the streamed video data in the respective data storage device 178, 912.

The various aspects of the present disclosure are combinable in any combination. Thus, any one or more of the following aspects of the present disclosure may be combined: the remote video access and control, the smart vehicle video transmission control, the alarm triggered video, the user interface, and the video transmission button.

In various embodiments, when no network connection is available, the vehicle controller 106 is configured to record the video data in the vehicle data storage device 178 and later transmitted to the remote server 900 when a telecommunications or cellular network connection becomes available. This aspect of the present disclosure has been discussed above with respect to FIG. 7. The operator of the remote server 900 is able to playback the recorded video data as has been previously described.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. It will similarly be appreciated that the graphical user interface may differ from that depicted in FIG. 6. Also, the arrangement of in-vehicle buttons 620 to 624 may differ from that depicted in FIG. 9. Further, it will be appreciated that the key fob or key fob app may differ from that shown in FIG. 10. In addition, it will be appreciated that certain steps of the processes may vary from those depicted in FIGS. 4, 5, 8 and 11 and/or described above in connection therewith. It will similarly be appreciated that certain steps of the methods described above may occur simultaneously or in a different order than that depicted in FIGS. 4, 5, 8 and 11 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

The invention claimed is:

1. A method of transmitting video data from a vehicle, comprising
    receiving, via a vehicle processor, a video transmission command that has been generated in response to a user selection of a video transmission input device;
    determining via the vehicle processor, whether a vehicle external security event is occurring, based on sensor data obtained from one or more vehicle security sensors;
    recording video data during a duration of the vehicle external security event via one or more vehicle cameras, via instructions provided by the vehicle processor, based on the determining that the vehicle external security event has occurred;
    labelling the video data as corresponding to the vehicle external security event, via the video processor; and
    transmitting, via the vehicle processor, the video data captured by one or more vehicle cameras during the vehicle external security event, along with the labelling of the video data as corresponding to the vehicle external security event, via instructions provided by the video processor in response to the received video transmission command, wherein transmission of video data is at least partly over a telecommunications network to a remote server.

2. The method of claim 1, wherein the video data is received at the remote server, rendered by a remote server processor and displayed on a display unit of the remote server.

3. The method of claim 2, further comprising establishing a conference between the operator of the remote server and an occupant of the vehicle to allow the operator and the occupant to talk to one another in response to the user selection.

4. The method of claim 1, further comprising:
    determining, via the vehicle processor, whether a network connection is available to transmit the video data to the remote server; and
    if it is determined that a network connection is unavailable, then:
        storing the video data locally within a memory onboard the vehicle, via instructions provided by the vehicle processor, until network connection is available; and
        when a network connection becomes available, transmitting, via instructions provided by the vehicle processor, the stored video data, along with the labelling of the video data as corresponding to the vehicle external security event, via the network connection to the remote server.

5. The method of claim 1, further comprising:
    determining, via the vehicle processor using the sensor data, when the vehicle external security event has terminated; and
    discontinuing the recording of the video data, when it is determined that the vehicle external security event has terminated.

6. The method of claim 1, further comprising:
    recording audio data during the duration of the vehicle event; and
    storing the audio data in local memory storage onboard the vehicle.

7. The method of claim 1, further comprising:
determining, via the vehicle processor using the sensor data, where the vehicle external security event is taking place in proximity to the vehicle; and
selecting which of the video cameras are to be used for recording of the video data during the vehicle external security event, based on the determination of where the vehicle external security event is taking place in proximity to the vehicle.

8. The method of claim 1, further comprising:
determining, via the vehicle processor using the sensor, where the vehicle external security event is taking place in proximity to the vehicle; and
selecting a field of view for the one or more cameras to utilize for recording of the video data during the vehicle external security event, based on the determination of where the vehicle external security event is taking place in proximity to the vehicle.

9. The method of claim 1, further comprising:
analyzing the video data via the vehicle processor; and
providing, via the vehicle processor, one or more enhancement commands to provide enhancements for the recording of the video data based on the analyzing of the video data.

10. The method of claim 9, wherein the step of providing the one or more enhancement commands comprises:
providing, via the vehicle processor, a command to wash a camera that is recording the video data, based on the analyzing of the video data.

11. The method of claim 9, wherein the step of providing the one or more enhancement commands comprises:
providing, via the vehicle processor, a command to articulate a camera that is recording the video data, based on the analyzing of the video data.

12. The method of claim 9, wherein the step of providing the one or more enhancement commands comprises:
providing, via the vehicle processor, a command to switch from one camera to another camera for recording the video data, based on the analyzing of the video data.

13. The method of claim 9, wherein the step of providing the one or more enhancement commands comprises:
providing, via the vehicle processor, a command to provide light enhancement for the one or more cameras that are recording the video data, based on the analyzing of the video data.

14. A method of activating one or more cameras of a vehicle, the method comprising:
providing a key fob having a camera activation button or other input device for remotely activating one or more vehicle cameras or providing a user device having a key fob app that generates, via a processor of the user device, a graphical user interface having a camera activation button or other input device for remotely activating one or more vehicle cameras;
transmitting a wireless command signal from a key fob or a user device in response to selection of the camera activation button or other input device;
activating the one or more vehicle cameras, via a vehicle processor, in response to the wireless command signal, to capture video data of at least the outside of the vehicle;
analyzing the video data; and
providing one or more enhancement commands to provide enhancements for the recording of the video data based on the analyzing of the video data, wherein the one or more enhancement commands are selected from the group consisting of the following: a command to wash a camera that is recording the video data, a command to articulate a camera that is recording the video data, a command to switch from one camera to another camera for recording the video data, based on the analyzing of the video data, and a command to provide light enhancement for the one or more cameras that are recording the video data, based on the analyzing of the video data.

15. The method of claim 14, wherein the one or more enhancement commands comprises a command to wash a camera that is recording the video data, based on the analyzing of the video data.

16. The method of claim 14, wherein the one or more enhancement commands comprises a command to articulate a camera that is recording the video data, based on the analyzing of the video data.

17. The method of claim 14, wherein the one or more enhancement commands comprises a command to switch from one camera to another camera for recording the video data, based on the analyzing of the video data.

18. The method of claim 14, wherein the one or more enhancement commands comprises a command to provide light enhancement for the one or more cameras that are recording the video data, based on the analyzing of the video data.

19. A system for transmitting video data from a vehicle, comprising
a video transmission input device for generating a video transmission command in response to a user selection;
a vehicle processor configured to:
receive the video transmission command, and in response to the video transmission command, the vehicle processor is configured to:
determine whether a vehicle external security event is occurring, based on sensor data obtained from one or more vehicle security sensors;
provide instructions for one or more vehicle cameras to record video data during a duration of the vehicle external security event, based on the determining that the vehicle external security event has occurred;
receive the video data captured by the one or more vehicle cameras;
label the video data as corresponding to the vehicle external security event; and
activate transmission of the video data recorded during the vehicle external security event, along with the labelling of the video data as corresponding to the vehicle external security event, at least partly over a telecommunications network to a remote server.

20. The system of claim 19, wherein the vehicle processor is configured to:
record the video data in a vehicle data storage device; and
when a connection with a telecommunications network is determined to be available: stream the video data to a remote server, a remote user device, or both, over the telecommunications network.

* * * * *